(12) United States Patent
Pedersen et al.

(10) Patent No.: US 12,320,457 B2
(45) Date of Patent: Jun. 3, 2025

(54) SYSTEMS AND METHODS FOR CONVEYING GAS AND TWIST-LOCK CONNECTORS FOR THE SAME

(71) Applicant: The Boeing Company, Arlington, VA (US)

(72) Inventors: Aaron J. Pedersen, Summerville, SC (US); Lance Mouser, Goose Creek, SC (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/363,858

(22) Filed: Aug. 2, 2023

(65) Prior Publication Data

US 2025/0043896 A1 Feb. 6, 2025

(51) Int. Cl.
*F16L 37/252* (2006.01)
*F16L 19/025* (2006.01)

(52) U.S. Cl.
CPC .......... *F16L 37/252* (2013.01); *F16L 19/025* (2013.01)

(58) Field of Classification Search
CPC ..... F16L 37/252; F16L 19/025; F16L 37/107; F16L 37/113; F16L 37/248; F16L 21/02; F16L 21/03; F16L 21/05
USPC .......................................... 285/91, 376, 377
See application file for complete search history.

(56) References Cited

U.S. PATENT DOCUMENTS

| | | | | |
|---|---|---|---|---|
| 266,359 A | * | 10/1882 | Gotzel ................. | F16L 37/252 285/376 |
| 290,663 A | * | 12/1883 | Blue ..................... | F16L 37/252 285/391 |
| 322,286 A | * | 7/1885 | Hemje .................. | F16L 37/252 285/361 |
| 331,170 A | * | 11/1885 | Thompson ............ | F16L 21/022 285/259 |
| 437,915 A | * | 10/1890 | Costigan ............... | F16L 37/252 285/401 |
| 643,358 A | * | 2/1900 | Konold ................. | F16L 37/252 285/85 |
| 692,795 A | * | 2/1902 | Moyle ................... | F16L 37/252 285/361 |
| 789,541 A | * | 5/1905 | Hayes ................... | F16L 37/252 285/376 |
| 808,446 A | * | 12/1905 | Gill et al. ............. | F16L 37/252 285/85 |
| 815,627 A | * | 3/1906 | Oldham ................ | F16L 37/252 285/376 |

(Continued)

FOREIGN PATENT DOCUMENTS

GB 1594982 A 8/1981

OTHER PUBLICATIONS

European Patent Office, Extended European Search Report, App. No. 24190454.9 (Jan. 13, 2025).

*Primary Examiner* — David Bochna

(74) *Attorney, Agent, or Firm* — Walters & Wasylyna LLC

(57) ABSTRACT

A twist-lock connector for coupling sections of a system for conveying gas includes a socket connector and a fitting connector. The socket connector includes a socket twist-lock. The fitting connector includes a fitting twist-lock. The socket connector receives the fitting connector to engage the fitting twist-lock and the socket twist-lock together by rotating the fitting connector about a connector axis relative to the socket connector.

20 Claims, 19 Drawing Sheets

(56) References Cited

U.S. PATENT DOCUMENTS

| | | | |
|---|---|---|---|
| 1,253,065 A * | 1/1918 | Looze | F16L 37/252 |
| | | | 285/85 |
| 2,111,859 A * | 3/1938 | Kennedy | F16L 37/252 |
| | | | 285/361 |
| 4,648,630 A | 3/1987 | Bruch | |
| 6,350,139 B1 | 2/2002 | Haag | |
| 6,398,128 B1 * | 6/2002 | Hamilton | B05B 1/042 |
| | | | 239/71 |
| 8,132,649 B2 | 3/2012 | Rogers | |
| 8,857,398 B2 | 10/2014 | Schieszl | |
| 11,135,538 B2 | 10/2021 | Niakan et al. | |
| 11,169,350 B2 | 11/2021 | Coenegracht et al. | |
| 11,415,248 B2 | 8/2022 | Berbiano et al. | |
| 11,460,137 B2 | 10/2022 | Parker | |
| 2011/0315720 A1 | 12/2011 | Marshall et al. | |
| 2019/0388819 A1 | 12/2019 | Niakan et al. | |
| 2021/0285586 A1 * | 9/2021 | Vinson | F16L 37/252 |

\* cited by examiner

SYSTEMS AND METHODS FOR CONVEYING GAS AND TWIST-LOCK CONNECTORS FOR THE SAME

FIELD

The present disclosure relates generally to gas transfer and, more particularly, to systems and methods conveying gas and twist-lock connectors used with such systems and methods.

BACKGROUND

During the manufacture of large structures, such as aircraft, certain manufacturing operations must be performed manually within relatively small or confined spaces, which can lead to air-quality issues within the space. To resolve the problem with air quality, hoses can be positioned to supply fresh, breathable air to the space. However, these hoses must be removed and/or repositioned each time a mechanic moves between different spaces or when a new structure moves into production. Due to the need to regularly remove, reposition, and reconnect the hoses, the hoses are often temporarily connected to air handlers and/or air distribution manifolds using tape, zip ties, and the like. Such makeshift or improvised connections are time consuming to complete and do not provide an effective seal between sections of the air conveying system. Accordingly, those skilled in the art continue with research and development efforts in the field of gas conveyance during manufacturing and, more particularly, in the air quality during manufacturing.

SUMMARY

Disclosed are examples of a twist-lock connector, a system for conveying gas, and a method for conveying gas. The following is a non-exhaustive list of examples, which may or may not be claimed, of the subject matter according to the present disclosure.

In an example, the disclosed twist-lock connector includes a socket connector and a fitting connector. The socket connector includes a socket twist-lock. The fitting connector includes a fitting twist-lock. The socket connector receives the fitting connector to engage the fitting twist-lock and the socket twist-lock together by rotating the fitting connector about a connector axis relative to the socket connector.

In an example, the disclosed system includes a first section, a second section, and a twist-lock connector for connecting the first section and the second section together in fluid communication. The twist-lock connector includes a socket connector and a fitting connector. The socket connector includes a socket twist-lock. The fitting connector includes a fitting twist-lock. The socket connector receives the fitting connector to engage the fitting twist-lock and the socket twist-lock together by rotating the fitting connector about a connector axis relative to the socket connector.

In an example, the disclosed method includes steps of: (1) coupling a first section of a system for conveying gas to an air handler; (2) coupling the first section to a second section of the system using an intake twist-lock connector; (3) coupling a third section of the system to the second section using an output twist-lock connector; and (4) running the third section to a confined space. Each one of the intake twist-lock connector and the output twist-lock connector includes a socket connector and a fitting connector. The socket connector includes a socket twist-lock. The fitting connector includes a fitting twist-lock. The socket connector receives the fitting connector to engage the fitting twist-lock and the socket twist-lock together by rotating the fitting connector about a connector axis relative to the socket connector.

Other examples of the twist-lock connector, the system, and the method will become apparent from the following detailed description, the accompanying drawings, and the appended claims.

DETAILED DESCRIPTION

Referring generally to FIGS. 1-18, by way of examples, the present disclosure is directed to a system 200 and a method 1000 for conveying, transferring, or otherwise handling gas, such as air. In one or more examples, the system 200 and/or the method 1000 can be used to distribute, deliver, or disperse gas, such as fresh, breathable air, to a desired space, such as a confined space. In one or more examples, the system 200 and/or method 1000 can be used to collect, remove, or gather gas, such as contaminated air and/or undesirable fumes, from a desired space, such as a confined space. By way of examples, the present disclosure is also directed to a twist-lock connector 100 used to couple and decouple sections of the system 200.

Examples of the twist-lock connector 100 solve the problem related to air quality within confined spaces during production operations. The twist-lock connector 100 enables different sections of the system 200 to be efficiently and effectively coupled together for distribution of fresh, breathable air to a space 230 (e.g., a confined space) or removal of contaminated air from the space 230 and then quickly and easily decoupled and recoupled, as desired. While the examples of the twist-lock connector 100 are described herein with respect to an air-handling system for distribution and/or removal of air within a confined space, the twist-lock connector 100 can be used with any suitable type of gas conveying system that includes multiple sections that are regularly coupled and decoupled during use.

Figure 1:
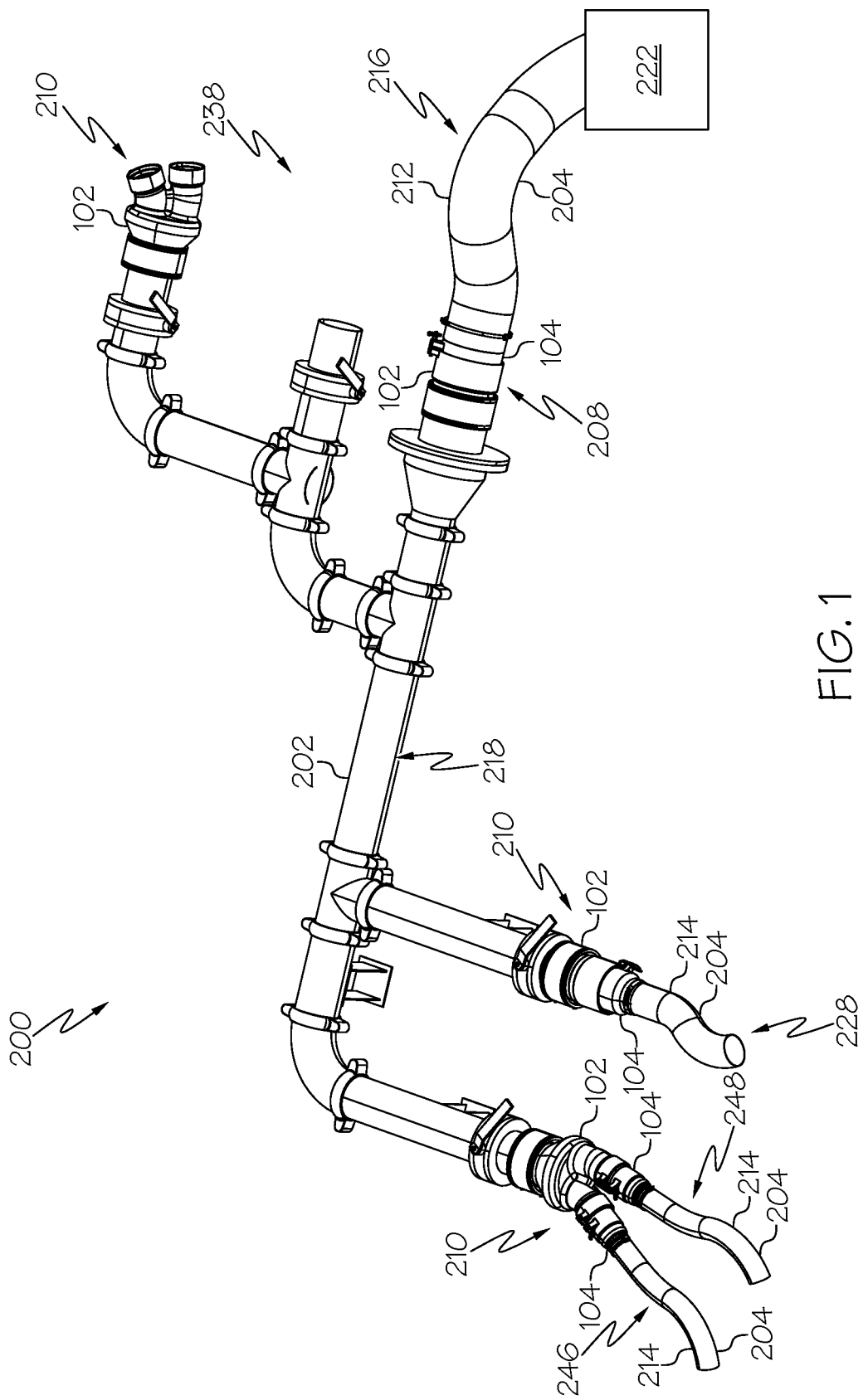
FIG. 1 is a schematic, perspective view of an example of a system for conveying gas.

FIG. 1 schematically illustrates an example of the system 200 for conveying gas (e.g., air). In one or more examples, the system 200 includes a number of sections 238 that are coupled together using a number of instances of the twist-lock connector 100. In the illustrated example, the system 200 includes a first section 216, a second section 218, and a third section 228. The first section 216 is coupled to the second section 218 using a first instance of the twist-lock connector 100. The third section 228 is coupled to the second section 218 using a second instance of the twist-lock connector 100. In some examples, the system 200 includes any number of additional sections, such as a fourth section 246, a fifth section 248, etc.

In one or more examples, the first section 216 includes or takes the form of a hose 204. The second section 218 includes or takes the form of a manifold 202. The third section 228 (and any additional sections, such as the fourth section 246, the fifth section 248, etc.) includes or takes the form of the hose 204. In other examples, the first section 216, the second section 218, and the third section 228 (and any additional sections, such as the fourth section 246, the fifth section 248, etc.) can include or take the form of any suitable type of flexible gas-conveying component, such as a conduit, a tube, and the like (referred to generally herein as hose 204) or any suitable type of rigid gas-conveying component such as a pipe, a conduit, a tube, and the like (referred to generally herein as pipe 220).

As an example, and illustrated in FIG. 1, the system 200 includes an air handler 222. An intake-hose 212 includes an intake end that is coupled to the air handler 222 and an output end that is coupled to an intake end of the manifold 202 via the first instance of the twist-lock connector 100, also referred herein as an intake twist-lock connector 208. The manifold 202 includes a number of output ends. An output-hose 214 includes an intake end that is coupled to at least one of the output ends of the manifold 202 via a second instance of the twist-lock connector 100, also referred to herein as an output twist-lock connector 210, and an output end that is positioned within the space 230 (e.g., confined space) to distribute air to the space 230 or remove air from the space 230.

In one or more examples, the air handler 222 is configured to distribute gas, such as air, to the space 230. As an example, the air handler 222 includes or takes the form of a fan 224, a blower, and the like. In one or more examples, the air handler 222 is configured to remove gas, such as air, from the space 230. As an example, the air handler 222 includes or takes the form a vacuum 226, a pump, and the like.

Referring now to FIGS. 1-17, disclosed are examples of the twist-lock connector 100 for coupling the sections 238, such as the first section 216, the second section 218, the third section 228, the fourth section 246, the fifth section 248, etc., of the system 200 together. The twist-lock connector 100 includes a number of elements, features, and components. The following are examples of the twist-lock connector 100, according to the present disclosure. Not all of the elements, features, and/or components described or illustrated in one example are required in that example. Some or all of the elements, features, and/or components described or illustrated in one example can be combined with other examples in various ways without the need to include other elements, features, and/or components described in those other examples, even though such combination or combinations are not explicitly described or illustrated by example herein.

Figure 17:
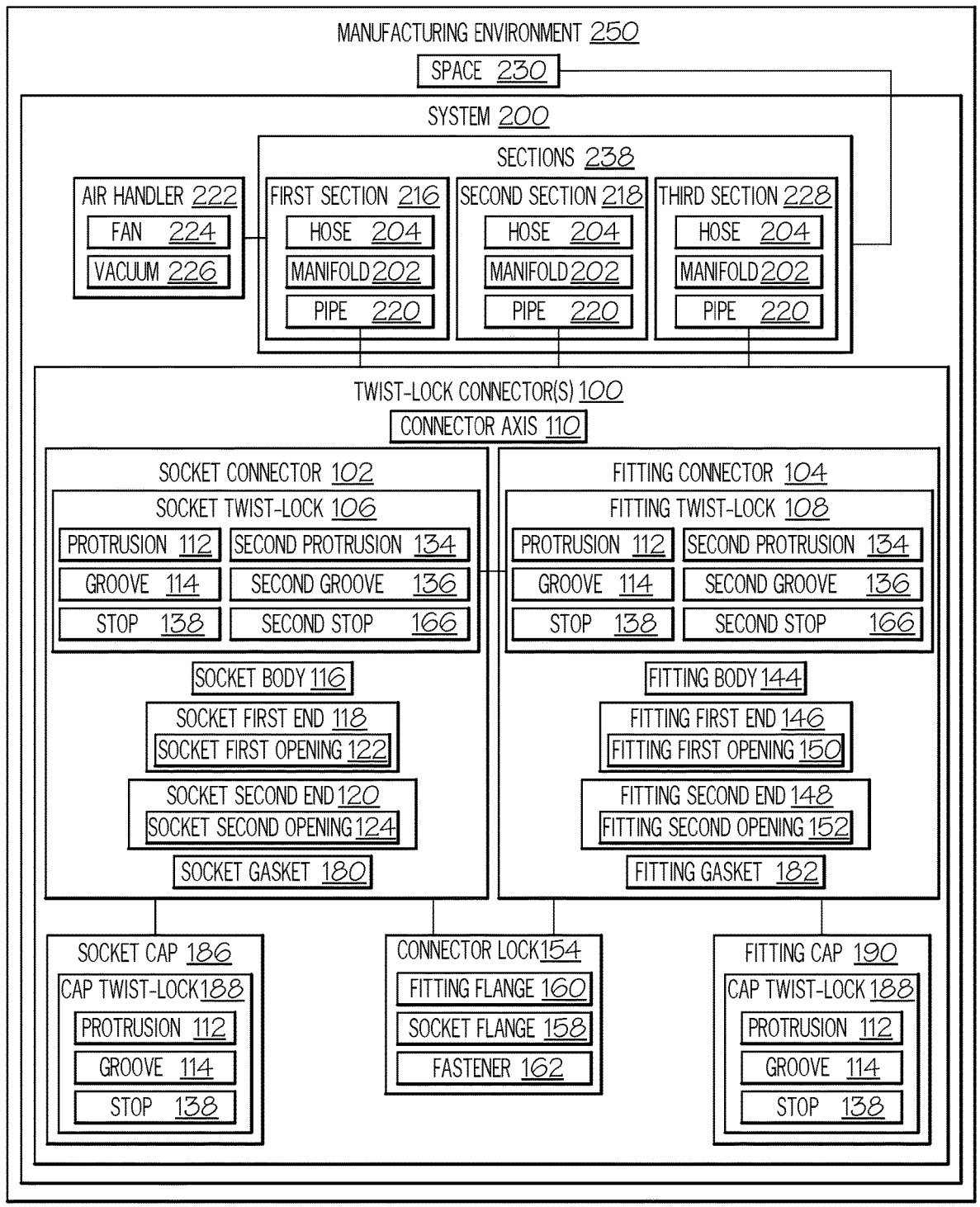
FIG. 17 is a schematic block diagram of a manufacturing environment.

Referring to FIGS. 1 and 17, in one or more examples, the twist-lock connector 100 is configured to couple and decouple the sections 238, such as the first section 216, the second section 218, the third section 228, the fourth section 246, the fifth section 248, etc., of the system 200. The twist-lock connector 100 includes a socket connector 102 and a fitting connector 104. The socket connector 102 includes a socket twist-lock 106. The fitting connector 104 includes a fitting twist-lock 108. The socket connector 102 receives the fitting connector 104 to engage the fitting twist-lock 108 and the socket twist-lock 106 together by rotating the fitting connector 104 about a connector axis 110 relative to the socket connector 102.

Figure 2:
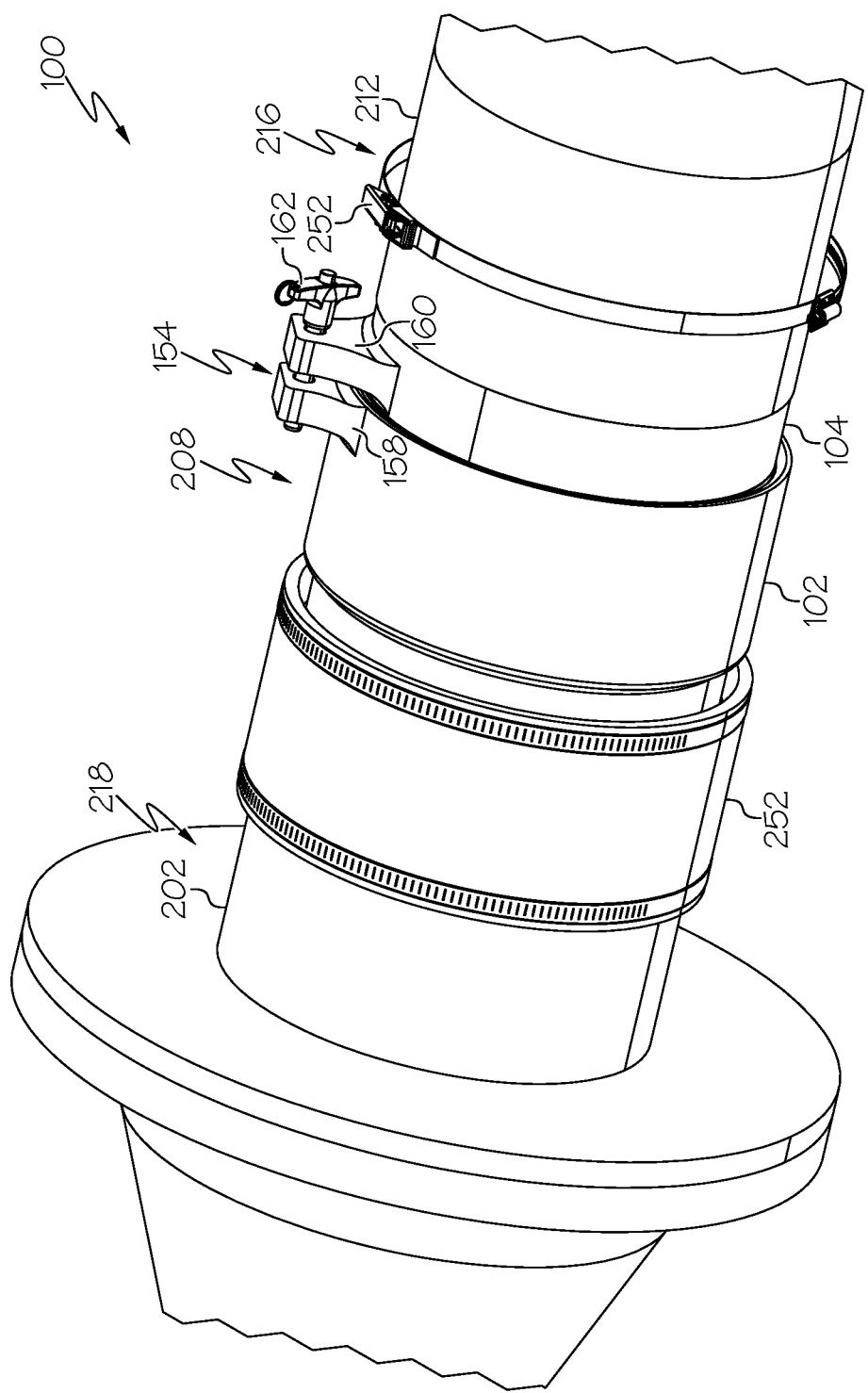
FIG. 2 is a schematic, perspective view of an example of a twist-lock connector joining a first section and a second section of the system.
Figure 3:
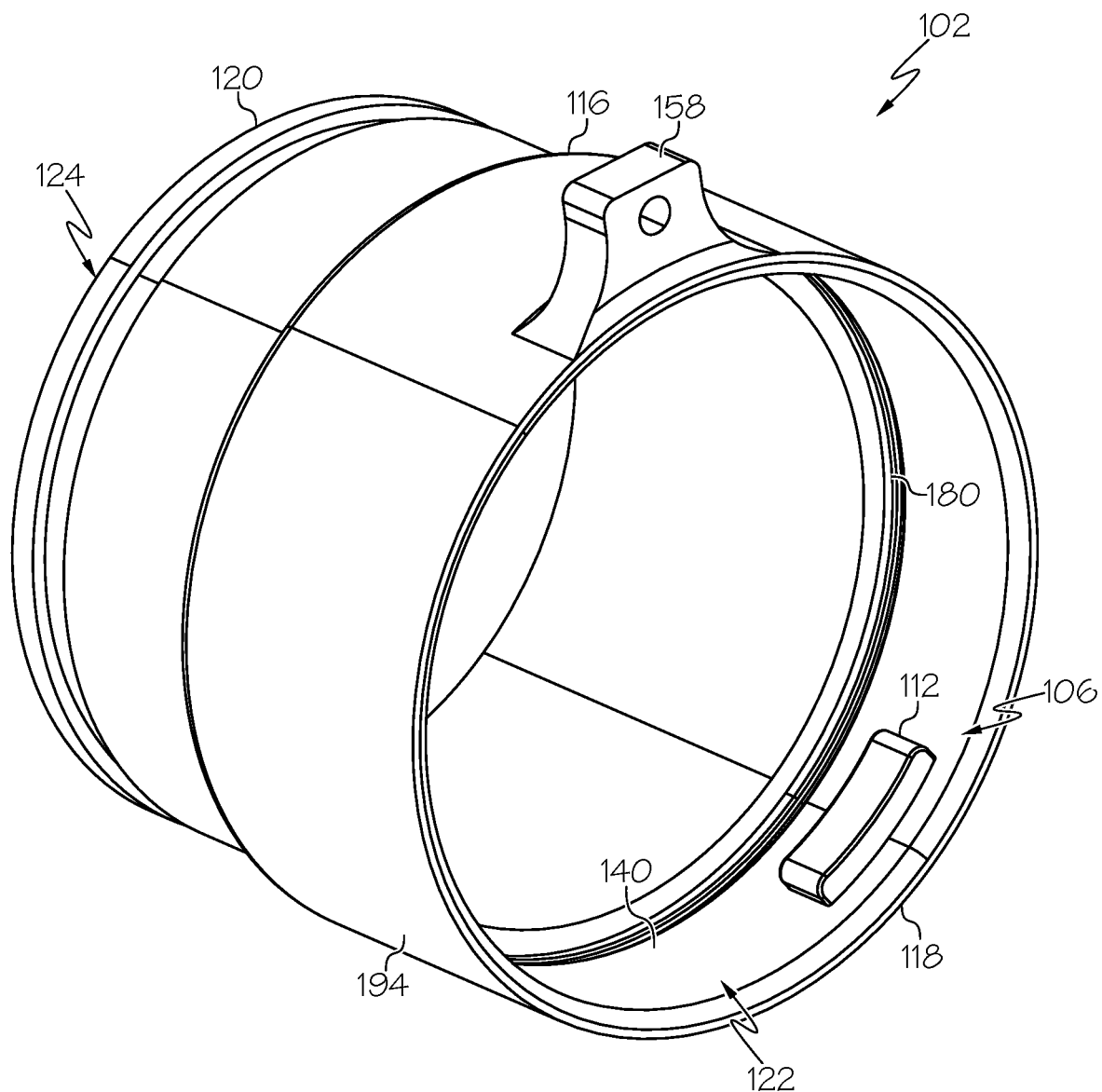
FIG. 3 is a schematic, perspective view of an example of a socket connector of the twist-lock connector of FIG. 2.
Figure 4:
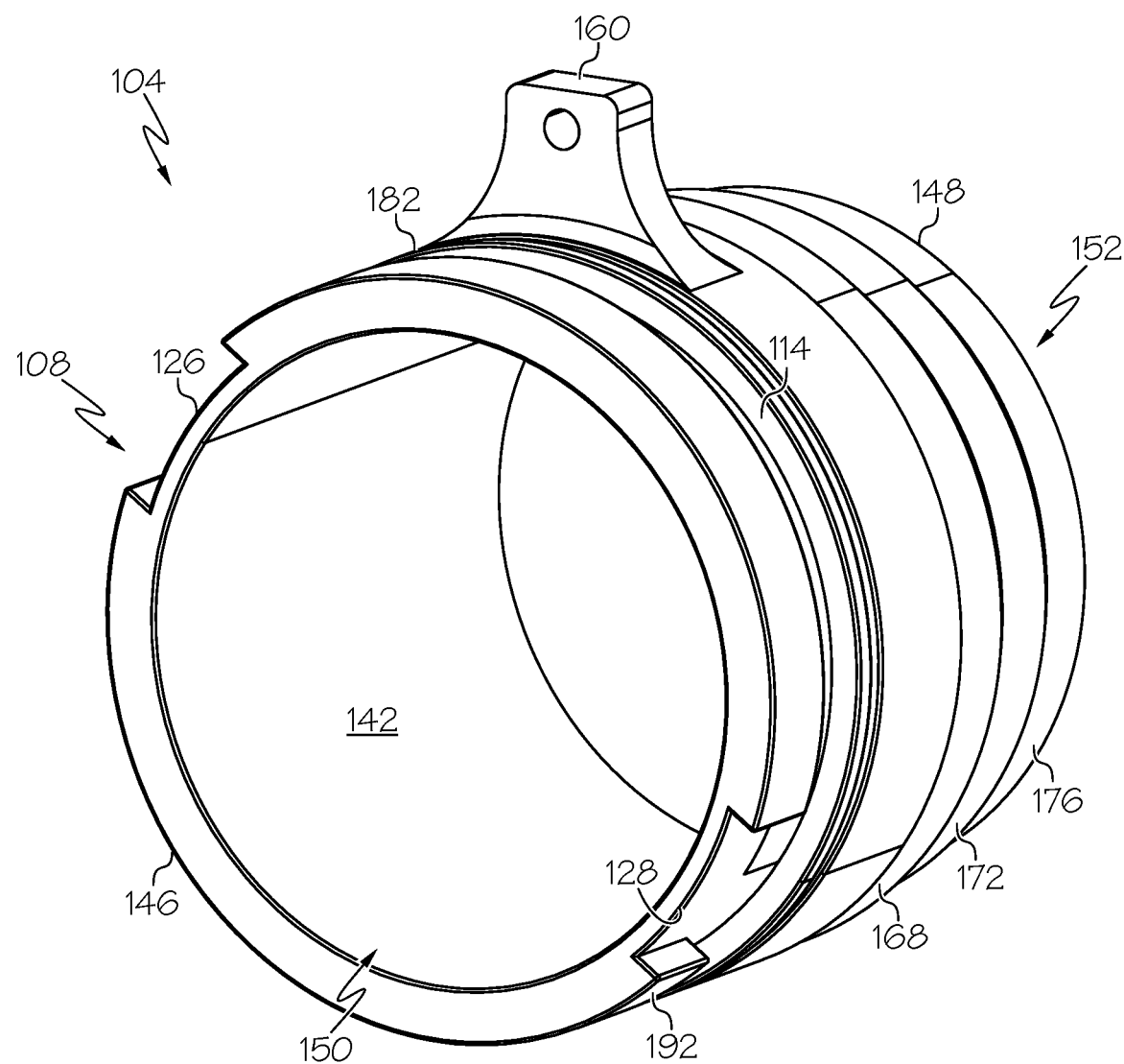
FIG. 4 is a schematic, perspective view of an example of a fitting connector of the twist-lock connector of FIG. 2.

FIGS. 2-4 schematically illustrate an example of the twist-lock connector 100 that is coupling two of the sections 238 of the system 200 together. In the illustrated example, the first section 216 is the intake-hose 212, the second section 218 is the manifold 202, and the twist-lock connector 100 is the intake twist-lock connector 208. The intake twist-lock connector 208 includes the socket connector 102 and the fitting connector 104. The socket connector 102 is coupled to an intake end of the manifold 202 via, for example, an instance of a clamp 252, such as a flexible sleeve coupling and hose clamps. The fitting connector 104 is coupled to an output end of the intake-hose 212 via, for example, another instance of the clamp 252, such as a hose clamp. The socket connector 102 and the fitting connector 104 are coupled together via mating engagement of the socket twist-lock 106 and the fitting twist-lock 108.

While not explicitly illustrated, in other examples, the fitting connector 104 is coupled to an intake end of the manifold 202 via, for example, an instance of a clamp 252. The socket connector 102 is coupled to an output end of the intake-hose 212 via, for example, another instance of the clamp 252. The socket connector 102 and the fitting connector 104 are coupled together via mating engagement of the socket twist-lock 106 and the fitting twist-lock 108.

Figure 5:
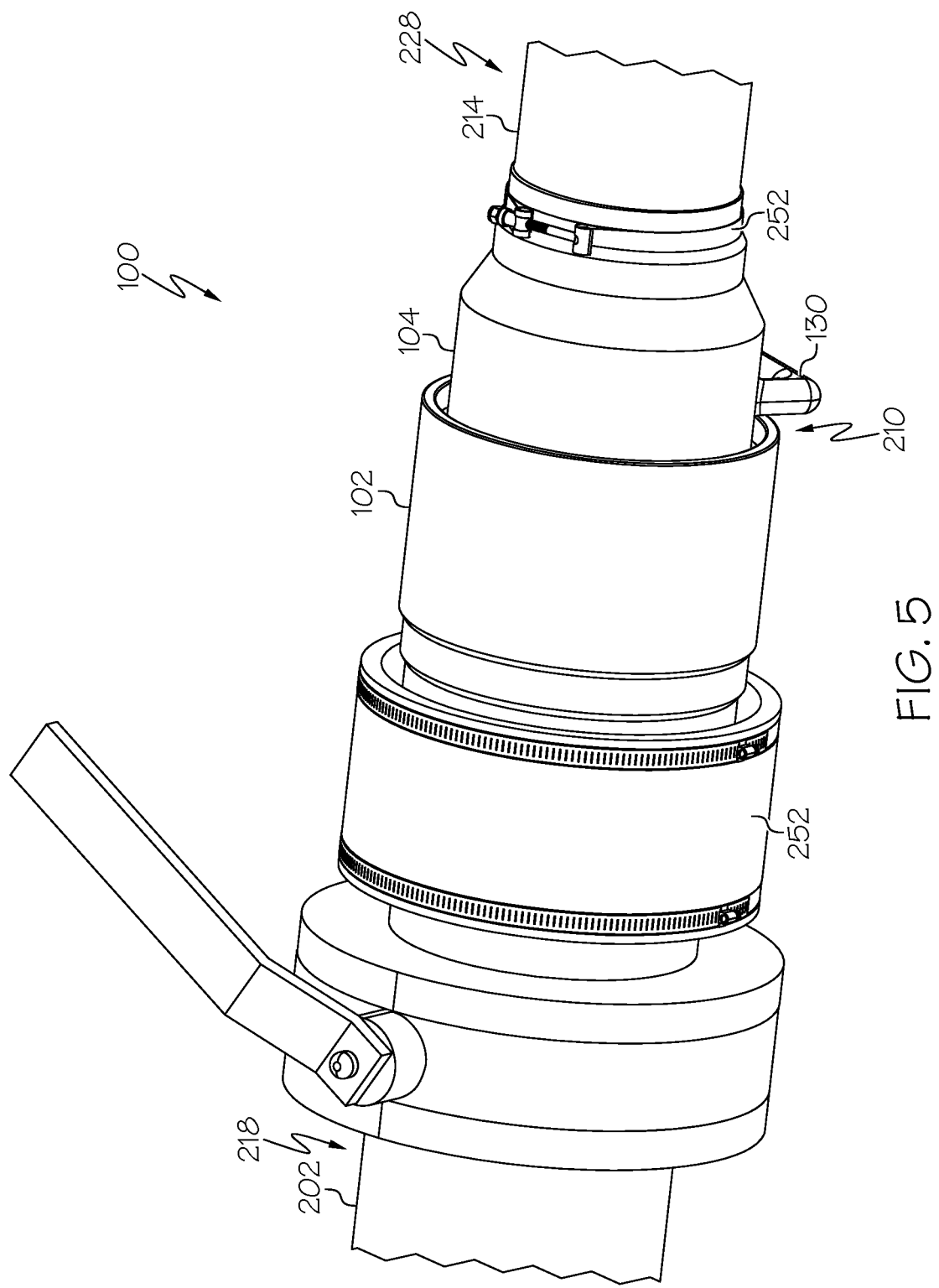
FIG. 5 is a schematic, perspective view of another example of the twist-lock connector joining a first section and a second section of the system.
Figure 6:
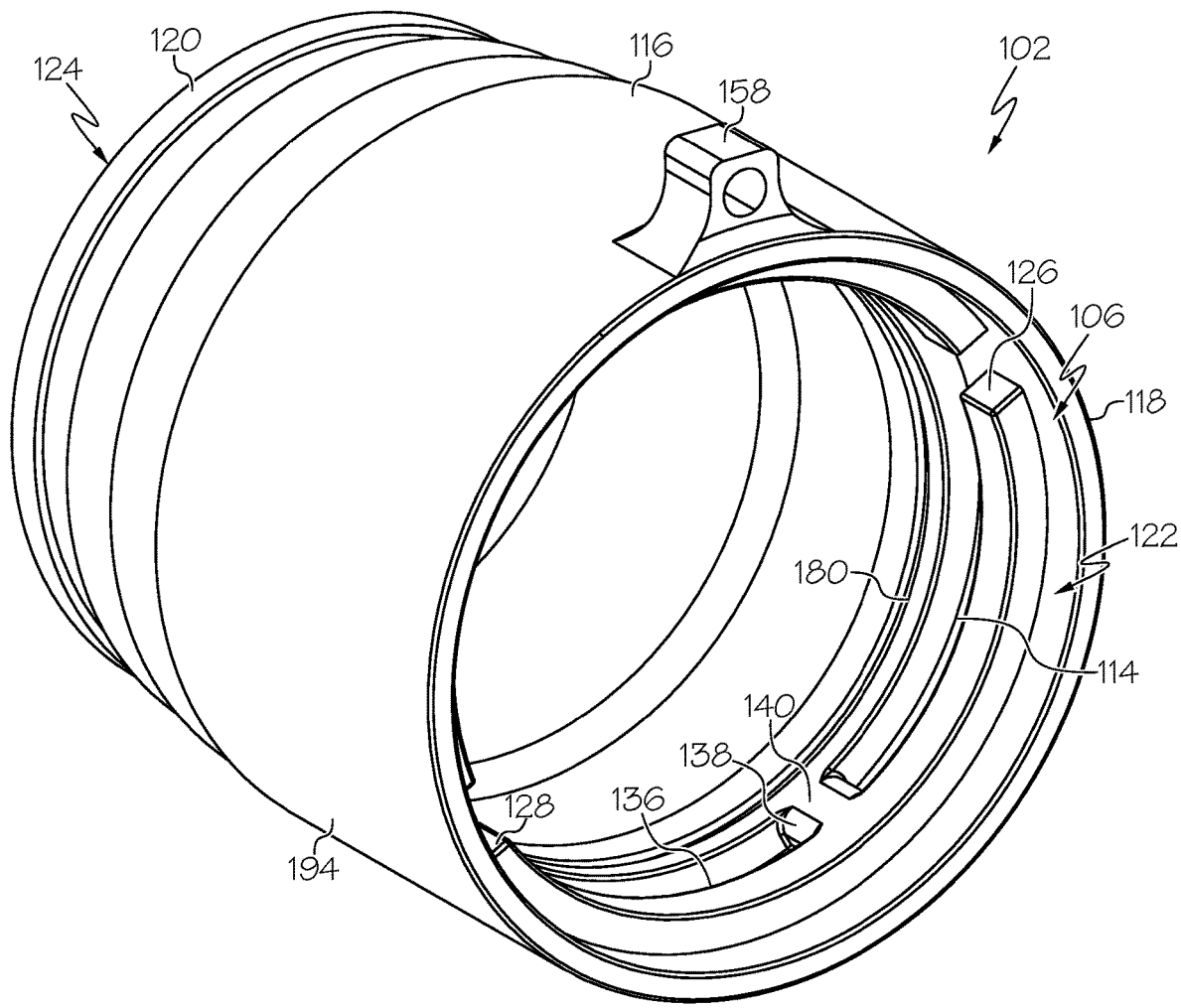
FIG. 6 is a schematic, perspective view of an example of the socket connector of the twist-lock connector of FIG. 5.
Figure 7:
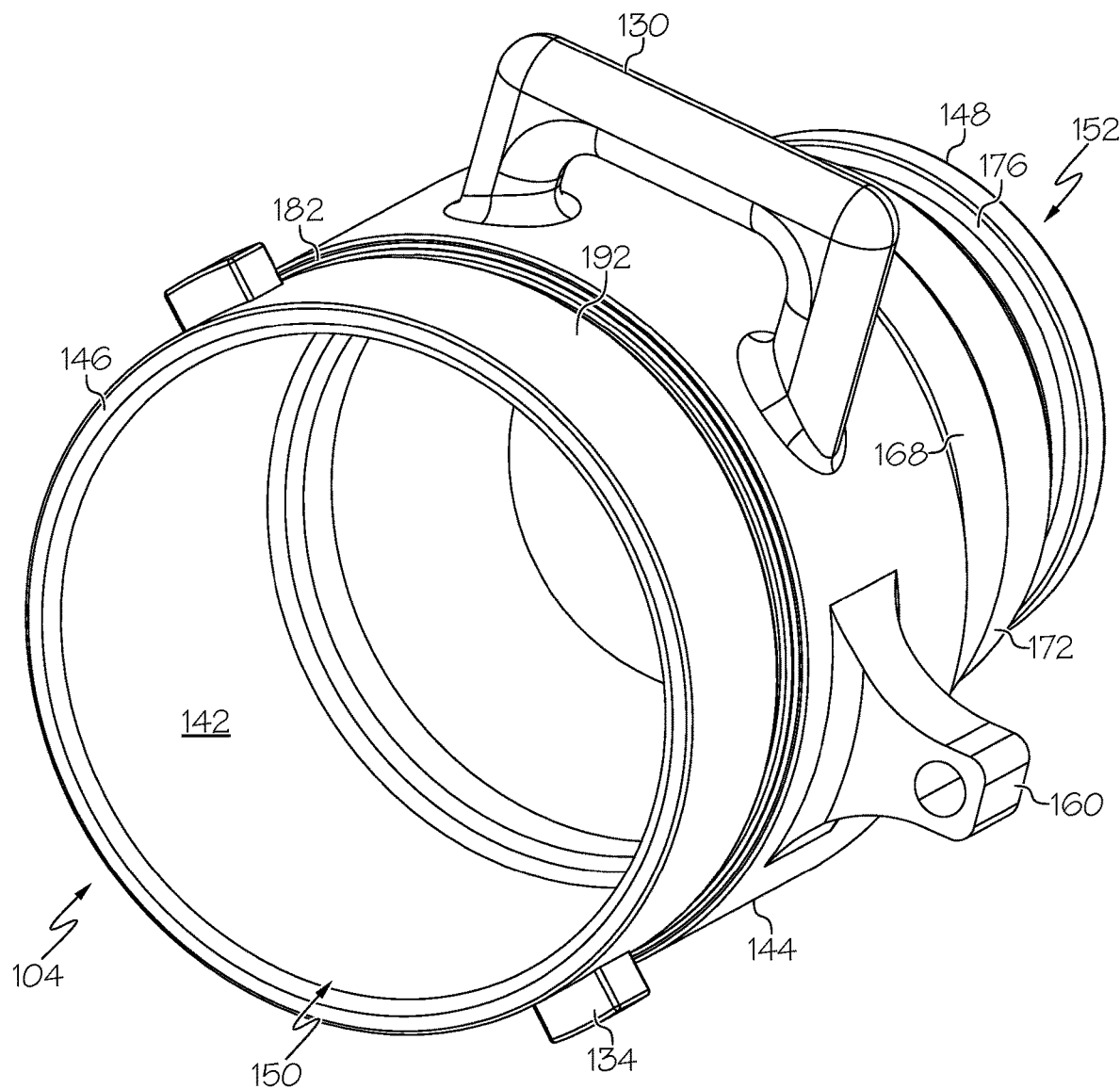
FIG. 7 is a schematic, perspective view of an example of the fitting connector of the twist-lock connector of FIG. 5.

FIGS. 5-7 schematically illustrate another example of the twist-lock connector 100 that is coupling two of the sections 238 of the system 200 together. In the illustrated example, the second section 218 is the manifold 202, the third section 228 is the output-hose 214, and the twist-lock connector 100 is the output twist-lock connector 210. The output twist-lock connector 210 includes the socket connector 102 and the fitting connector 104. The socket connector 102 is coupled to an output end of the manifold 202 via, for example, an instance of the clamp 252, such as a flexible sleeve coupling and hose clamps. The fitting connector 104 is coupled to an intake end of the output-hose 214 via, for example, another instance of the clamp 252, such as a hose clamp. The socket connector 102 and the fitting connector 104 are coupled together via mating engagement of the socket twist-lock 106 and the fitting twist-lock 108.

While not explicitly illustrated, in other examples, the fitting connector 104 is coupled to an output end of the manifold 202 via, for example, an instance of the clamp 252. The socket connector 102 is coupled to an intake end of the output-hose 214 via, for example, another instance of the clamp 252. The socket connector 102 and the fitting connector 104 are coupled together via mating engagement of the socket twist-lock 106 and the fitting twist-lock 108.

Figure 8:
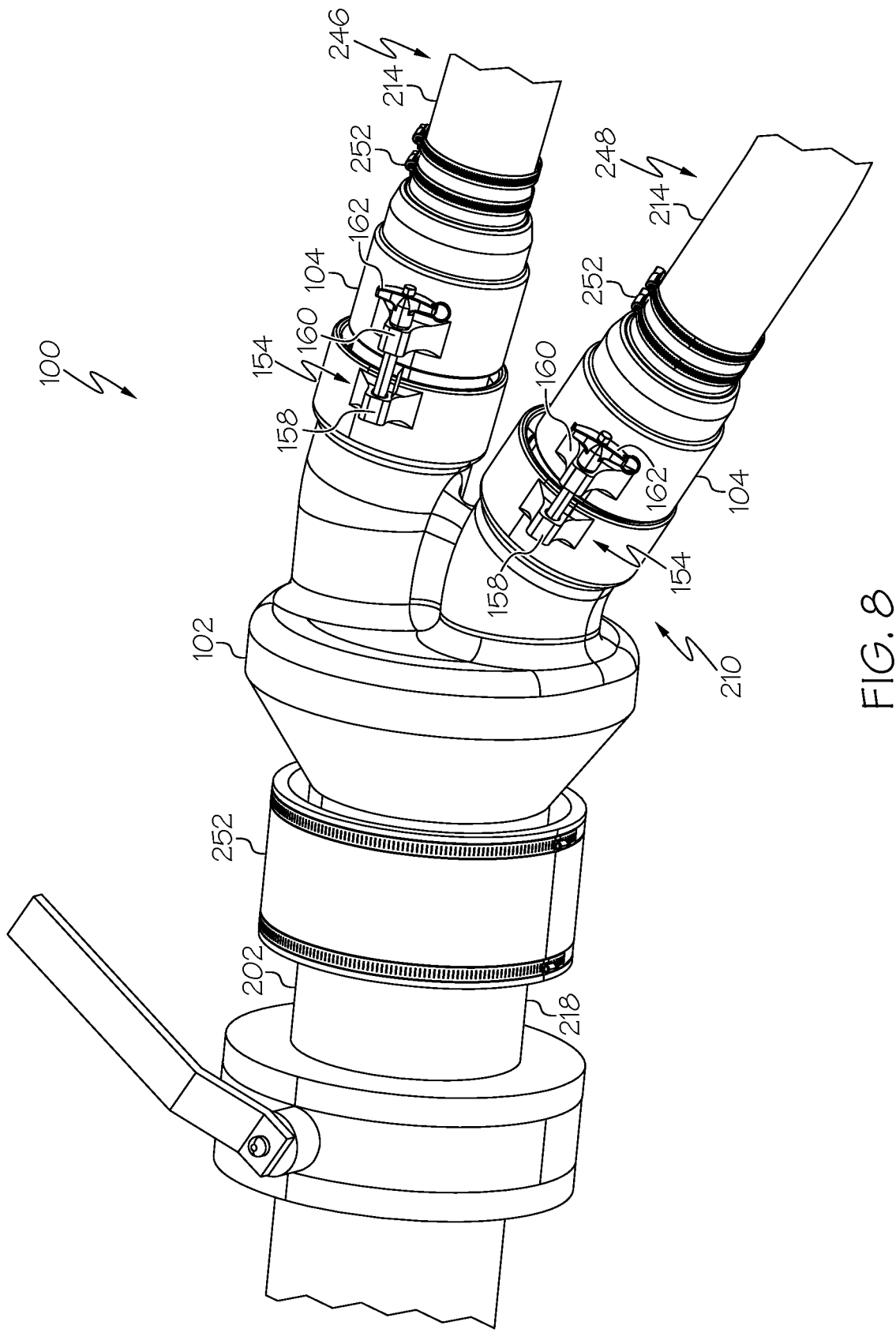
FIG. 8 is a schematic, perspective view of another example of the twist-lock connector joining a first section and a second section of the system.
Figure 9:
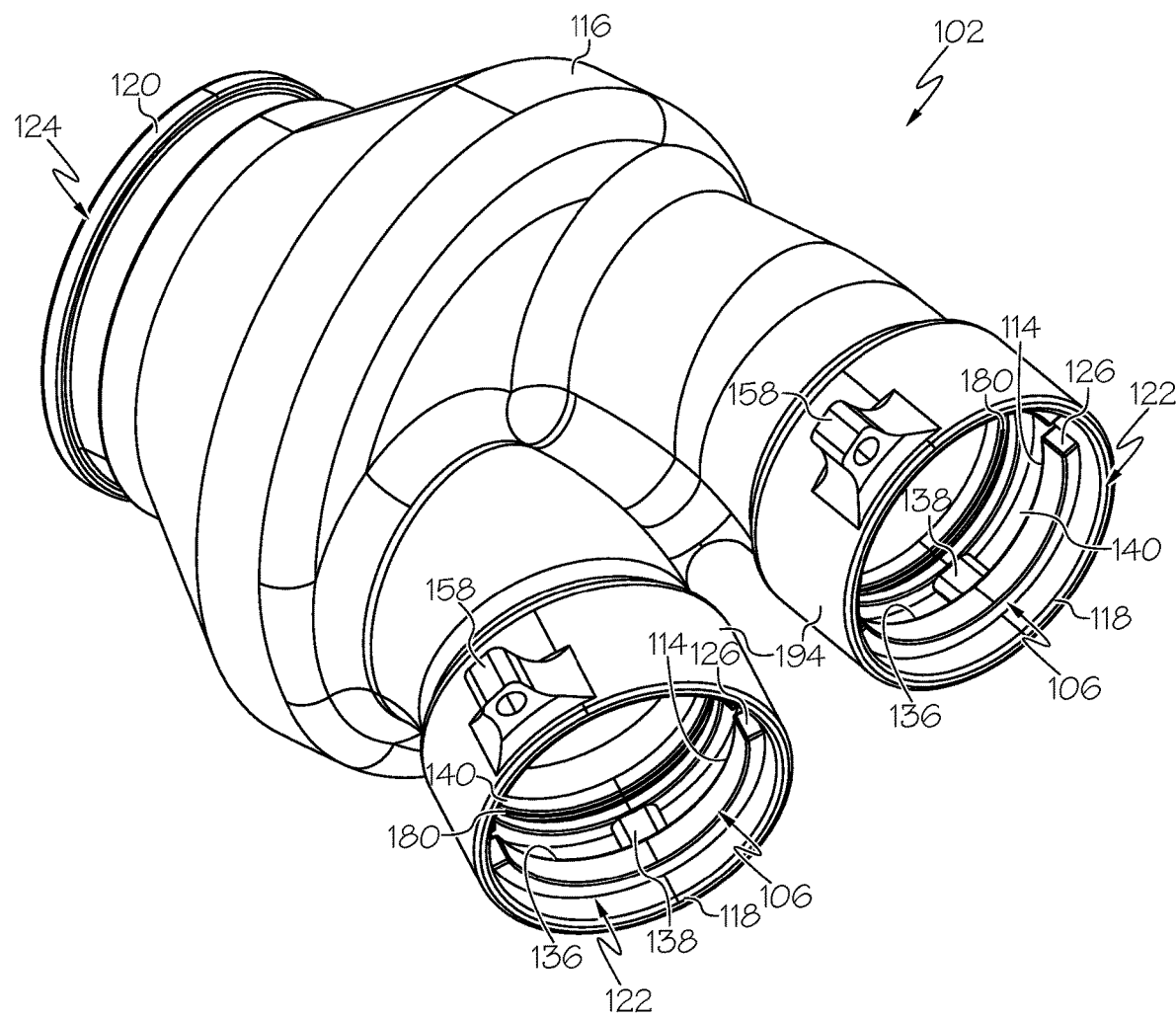
FIG. 9 is a schematic, perspective view of an example of the socket connector of the twist-lock connector of FIG. 8.
Figure 10:
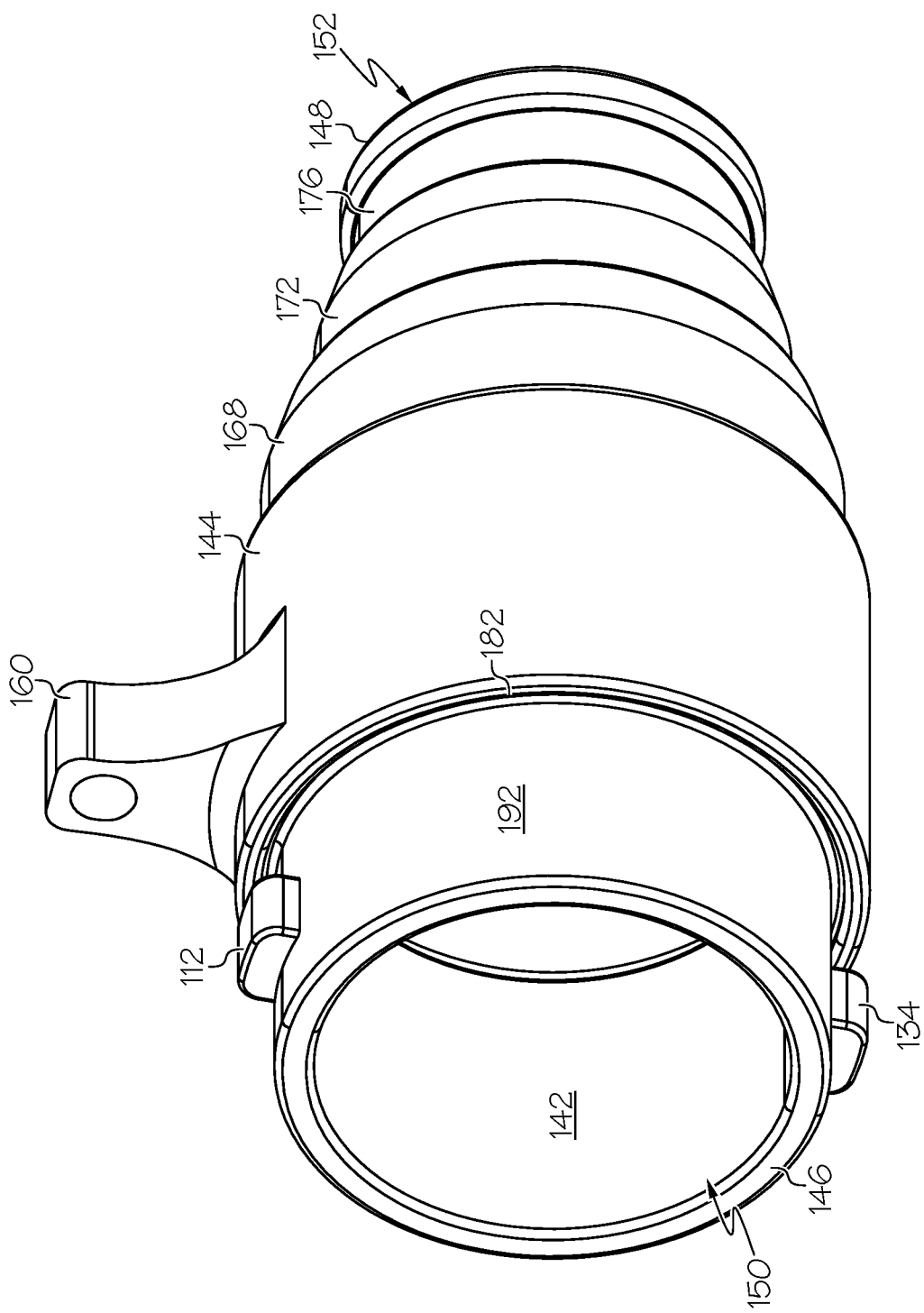
FIG. 10 is a schematic, perspective view of an example of fitting connectors of the twist-lock connector of FIG. 8.

FIGS. 8-10 schematically illustrate another example of the twist-lock connector 100 that is coupling two of the sections 238 of the system 200 together. In the illustrated example, the second section 218 is the manifold 202, the fourth section 246 is the output-hose 214, the fifth section 248 is the output-hose 214, and the twist-lock connector 100 is the output twist-lock connector 210. The output twist-lock connector 210 includes the socket connector 102 and two instances of the fitting connector 104. The socket connector 102 is coupled to an output end of the manifold 202 via, for example, an instance of the clamp 252, such as a flexible sleeve coupling and hose clamps. Each instance of the fitting connector 104 is coupled to an intake end of the output-hose 214 via, for example, another instance of the clamp 252, such as a hose clamp. The socket connector 102 and each instance of the fitting connector 104 are coupled together via mating engagement of the socket twist-lock 106 and the fitting twist-lock 108.

The examples illustrated in FIGS. 8-10 depict an implementation of the twist-lock connector 100 that includes one intake and two outputs. As an example, the socket connector 102 includes one intake opening and two output openings. The output openings of the socket connector 102 receive and are coupled to two instances of the fitting connector 104 via mating engagement of the socket twist-lock 106 and the fitting twist-lock 108.

While not explicitly illustrated, in other examples, the fitting connector 104 is coupled to an output end of the manifold 202 via, for example, an instance of the clamp 252. Each instance of the socket connector 102 is coupled to an intake end of the output-hose 214 via, for example, another instance of the clamp 252. The fitting connector 104 and each instance of the socket connector 102 are coupled together via mating engagement of the socket twist-lock 106 and the fitting twist-lock 108.

Referring to FIGS. 3, 4, 6, 7, 9, 10 and 17, in one or more examples, the socket twist-lock 106 includes one of a groove 114 or a protrusion 112. The fitting twist-lock 108 includes another (e.g., cooperating or complementary) one of the protrusion 112 or the groove 114. The protrusion 112 is seated in the groove 114 by inserting the fitting connector 104 in the socket connector 102. The protrusion 112 is moved to a secured position within the groove 114 rotating the fitting connector 104 about the connector axis 110 relative to the socket connector 102.

Referring to FIGS. 3 and 4, in one or more examples, the socket twist-lock 106 includes the protrusion 112. The fitting twist-lock 108 includes the groove 114. The protrusion 112 is seated in the groove 114 by inserting the fitting connector 104 in the socket connector 102. The protrusion 112 is moved to a secured position within the groove 114 rotating the fitting connector 104 about the connector axis 110 relative to the socket connector 102.

Referring to FIGS. 6, 7, 9 and 10, in one or more examples, the socket twist-lock 106 includes the groove 114. The fitting twist-lock 108 includes another the protrusion 112. The protrusion 112 is seated in the groove 114 by inserting the fitting connector 104 in the socket connector 102. The protrusion 112 is moved to a secured position within the groove 114 rotating the fitting connector 104 about the connector axis 110 relative to the socket connector 102.

Referring to FIGS. 3, 4, 6, 7, 9, 10 and 17, in one or more examples, the groove 114 includes a recess 126. The recess 126 receives the protrusion 112 such that the protrusion 112 is positioned within the groove 114 upon the fitting connector 104 being inserted in the socket connector 102.

Referring to FIGS. 3, 4, 6, 7, 9, 10 and 17, in one or more examples, the groove 114 includes a stop 138. The stop 138 limits rotation of the fitting connector 104 about the connector axis 110 relative to the socket connector 102. As an example, the stop 138 is located within the groove 114 such that the protrusion 112 engages the stop 138 upon sufficient rotation of the fitting connector 104 about the connector axis 110 relative to the socket connector 102 to securely couple the socket connector 102 and the fitting connector 104 together.

Referring to FIGS. 3, 4, 6, 7, 9, 10 and 17, in one or more examples, the socket twist-lock 106 includes one of a second groove 136 or a second protrusion 134. The fitting twist-lock 108 includes another (e.g., a complementary or cooperating) one of the second protrusion 134 or the second groove 136. The second protrusion 134 is seated in the second groove 136 by inserting the fitting connector 104 in the socket connector 102. The second protrusion 134 is moved to a secured position within the second groove 136 by rotating the fitting connector 104 about the connector axis 110 relative to the socket connector 102.

Referring to FIGS. 3, 4, 6, 7, 9, 10 and 17, in one or more examples, the second groove 136 includes a second recess 128. The second recess 128 receives the second protrusion 134 such that the second protrusion 134 is positioned within the second groove 136 upon the fitting connector 104 being inserted in the socket connector 102.

Referring to FIGS. 3, 4, 6, 7, 9, 10 and 17, in one or more examples, the second groove 136 includes a second stop 166. The second stop 166 limits rotation of the fitting connector 104 about the connector axis 110 relative to the socket connector 102. As an example, the second stop 166 is located within the second groove 136 such that the second protrusion 134 engages the second stop 166 upon sufficient rotation of the fitting connector 104 about the connector axis 110 relative to the socket connector 102 to securely couple the socket connector 102 and the fitting connector 104 together.

In one or more examples, the protrusion 112 and the second protrusion 134 are diametrically opposite to each other. In one or more examples, the groove 114 and the second groove 136 are semi-annular. In one or more examples, the stop 138 and the second stop 166 are diametrically opposite to each other.

Referring to FIGS. 2, 8, 16 and 17, in one or more examples, the twist-lock connector 100 includes a connector lock 154. The connector lock 154 selectively enables rotation of the fitting connector 104 about the connector axis 110 relative to the socket connector 102 or selectively restricts rotation of the fitting connector 104 about the connector axis 110 relative to the socket connector 102.

Referring to FIGS. 3, 4, 6, 7, 9, 10, 16 and 17, in one or more examples, the connector lock 154 includes a socket flange 158 and a fitting flange 160. The socket flange 158 projects outwardly from a socket body 116 of the socket connector 102. The fitting flange 160 projects outwardly from a fitting body 144 of the fitting connector 104. The connector lock 154 also includes a fastener 162 that connects the socket flange 158 and the fitting flange 160.

The socket flange 158 and the fitting flange 160 are respectively located on the socket connector 102 and the fitting connector 104 such that upon rotating the fitting connector 104 about the connector axis 110 relative to the socket connector 102 to move the protrusion 112 to a secured position within the groove 114, the socket flange 158 and the fitting flange 160 are at least approximately aligned and in a face-to-face relationship to each other. In one or more examples, each one of the socket flange 158 and the fitting flange 160 includes a lock aperture formed therethrough that is configured (e.g., suitably sized and shaped) to receive the fastener 162. With the socket flange 158 and the fitting flange 160 aligned, the lock aperture of each is at least approximately aligned such that the fastener 162 can be inserted through the lock aperture of both the socket flange 158 and the fitting flange 160. The fastener 162 can be any suitable fastener, such as, but not limited to, a pad lock, a pin, a threaded fastener, a zip tie, a lockout tag, and the like.

Referring to FIGS. 3, 4, 6, 7, 9, 10 and 17, in one or more examples, the socket connector 102 includes the socket body 116, a socket first end 118 having a socket first opening 122, and a socket second end 120 having a socket second opening 124. The fitting connector 104 includes the fitting body 144, a fitting first end 146 having a fitting first opening 150, and a fitting second end 148 having a fitting second opening 152.

Generally, during coupling of the socket connector 102 and the fitting connector 104, at least a portion of the fitting first end 146 is inserted in the socket first opening 122 of the socket first end 118 such that the socket first opening 122 and the fitting first opening 150 are in fluid communication along the connector axis 110. Insertion of the fitting first end 146 in the socket first opening 122 of the socket first end 118 positions the protrusion 112 through the recess 126 and within the groove 114. Rotation of the fitting connector 104 about the connector axis 110 relative to the socket connector 102 moves the protrusion 112 along the groove 114 to a secure position.

In one or more examples, the socket body 116 and the fitting body 144 include a generally tubular body having an at least approximately circular cross-sectional shape viewed along the connector axis 110. As such, in one or more examples, the socket first end 118 and the socket second end 120 are generally tubular such that the socket first opening 122 and the socket second opening 124 are generally circular in shape. Similarly, in one or more examples, the fitting first end 146 and the fitting second end 148 are generally tubular such that the fitting first opening 150 and the fitting second opening 152 are generally circular. However, in other examples, the socket connector 102 and the fitting connector 104 can have other shapes.

Referring to FIGS. 8-10, in one or more examples, the socket first end 118 includes two instances of the socket first opening 122 and one instance of the socket second opening 124. In these examples, the socket first end 118 has two output openings and the socket second end 120 has one intake opening.

Referring to FIGS. 3, 4, 6, 7, 9, 10 and 17, in one or more examples, the socket twist-lock 106 is located at or proximate (e.g., near) the socket first end 118. The fitting twist-lock 108 is located at or proximate (e.g., near) the fitting first end 146. The fitting twist-lock 108 engages the socket twist-lock 106 by inserting the fitting first end 146 in the socket first end 118 and rotating the fitting connector 104 about the connector axis 110 relative to the socket connector 102.

Referring to FIGS. 3, 4, 6, 7, 9, 10 and 17, in one or more examples, the socket first end 118 includes a socket-first-end inner surface 140 and a socket-first-end outer surface 194. The socket twist-lock 106 includes one of the groove 114 that is formed in the socket-first-end inner surface 140 or the protrusion 112 that projects radially inward from the socket-first-end inner surface 140. The fitting first end 146 includes a fitting-first-end inner surface 142 and a fitting-first-end outer surface 192. The fitting twist-lock 108 includes another (e.g., cooperating or complementary) one of the protrusion 112 that projects radially outward from the fitting-first-end outer surface 192 or the groove 114 that is formed in the fitting-first-end outer surface 192. The protrusion 112 is seated in the groove 114 by inserting the fitting first end 146 in the socket first end 118. The protrusion 112 is moved to a secured position within the groove 114 by rotating the fitting connector 104 about the connector axis 110 relative to the socket connector 102.

Referring to FIGS. 3 and 4, in one or more examples, the socket twist-lock 106 includes the protrusion 112 that projects radially inward from the socket-first-end inner surface 140. The fitting twist-lock 108 includes the groove 114 that is formed in the fitting-first-end outer surface 192. The protrusion 112 is seated in the groove 114 by inserting the fitting first end 146 in the socket first end 118. The protrusion 112 is moved to a secured position within the groove 114 by rotating the fitting connector 104 about the connector axis 110 relative to the socket connector 102.

Referring to FIGS. 6, 7, 9 and 10, in one or more examples, the socket twist-lock 106 includes one of the groove 114 that is formed in the socket-first-end inner surface 140. The fitting twist-lock 108 includes the protrusion 112 that projects radially outward from the fitting-first-end outer surface 192. The protrusion 112 is seated in the groove 114 by inserting the fitting first end 146 in the socket first end 118. The protrusion 112 is moved to a secured position within the groove 114 by rotating the fitting connector 104 about the connector axis 110 relative to the socket connector 102.

Accordingly, the protrusion-and-groove connection is characterized by its structural integrity and ease of use. The connection includes the protrusion 112 and the groove 114 that are formed on the mating surfaces of the interconnected components (e.g., socket connector 102 and fitting connector 104) of the twist-lock connector 100. In one or more examples, the protrusion 112 includes a profile shape and the groove 114 includes a complementary groove shape, thereby ensuring secure engagement between the socket connector 102 and the fitting connector 104 and minimizing the risk of misalignment during coupling of the sections 238 of the system 200.

The protrusion 112 and the groove 114 of the socket twist-lock 106 and the fitting twist-lock 108 is versatile and compatible with a wide range of materials, including but not limited to metal, plastic, and composite materials. The dimensions, angles, and tolerances of the protrusion 112 and groove 114 can be adapted to suit specific application requirements, providing a customizable solution. Accordingly, the twist-lock connector 100 can be manufactured using a wide variety of materials and manufacturing techniques.

Referring to FIGS. 3, 4, 6, 7, 9, 10 and 17, in one or more examples, the socket twist-lock 106 includes one of the second groove 136 that is formed in the socket-first-end inner surface 140 or the second protrusion 134 that projects radially inward from the socket-first-end inner surface 140. The fitting twist-lock 108 includes another (e.g., cooperating or complementary) one of the second protrusion 134 that projects radially outward from the fitting-first-end outer surface 192 or the second groove 136 that is formed in the fitting-first-end outer surface 192. The second protrusion 134 is seated in the second groove 136 by inserting the fitting first end 146 in the socket first end 118. The second protrusion 134 is moved to a secured position within the second groove 136 by rotating the fitting connector 104 about the connector axis 110 relative to the socket connector 102.

Referring to FIGS. 3, 4, 6, 7, 9, 10 and 17, in one or more examples, the stop 138 is located on the socket-first-end inner surface 140 between the groove 114 and the second groove 136. The stop 138 limits rotation of the fitting connector 104 about the connector axis 110 relative to the socket connector 102.

Referring to FIGS. 3, 4, 6, 7, 9, 10 and 17, in one or more examples, the second stop 166 is located on the socket-first-end inner surface 140 between the groove 114 and the second groove 136. The second stop 166 limits rotation of the fitting connector 104 about the connector axis 110 relative to the socket connector 102 in a first rotational direction relative. The second stop 166 limits rotation of the fitting connector 104 about the connector axis 110 relative to the socket connector 102 in a second rotational direction that is opposite the first rotational direction.

Referring to FIGS. 1, 2, 5, 8 and 15-17, in one or more examples, the second section 218 of the system 200 includes the hose 204. In these examples, the fitting second end 148 is configured to be inserted within a hose opening of the hose 204. In one or more examples, the fitting second end 148 includes a first portion 168 and a second portion 172. The first portion 168 extends from the fitting body 144 along the connector axis 110 and has a first outer dimension 170. The second portion 172 extends from first portion 168 along the connector axis 110 and has a second outer dimension 174. The second outer dimension 174 is less than the first outer dimension 170. In one or more examples, the fitting second end 148 also includes a third portion 176 that extends from the second portion 172 along the connector axis 110 and has a third outer dimension 178. The third outer dimension 178 is less than the second outer dimension 174.

The first portion 168, the second portion 172, and the third portion 176, each having different outer dimensions (e.g., diameters) enables a single instance of the fitting connector 104 to be usable with hoses of different diameters. As examples, the fitting connector 104 can be inserted up to the first portion 168 for large diameter hoses, inserted up to the second portion 172 for medium diameter hoses, and inserted up to the third portion 176 for small diameter hoses.

While not explicitly illustrated, in other examples, the socket second end 120 is configured to be inserted within the hose opening of the hose 204. In these examples, the socket second end 120 includes the first portion 168 and the second portion 172. The first portion 168 extends from the socket body 116 along the connector axis 110 and has the first outer dimension 170. The second portion 172 extends from first portion 168 along the connector axis 110 and has the second outer dimension 174. The second outer dimension 174 is less than the first outer dimension 170. In one or more examples, the socket second end 120 also includes the third portion 176 that extends from the second portion 172 along the connector axis 110 and has the third outer dimension 178. The third outer dimension 178 is less than the second outer dimension 174.

Referring to FIGS. 3, 4, 6, 7, 9, 10, 15 and 17, in one or more examples, the socket connector 102 includes a socket gasket 180. The socket gasket 180 is located on the socket first end 118. In one or more examples, with the fitting first end 146 received by the socket first end 118, the socket gasket 180 is located at the fitting first opening 150. The socket gasket 180 is configured to contact and form an air-tight seal with the fitting-first-end outer surface 192 when the fitting first end 146 is inserted within the socket first opening 122 of the socket first end 118.

Referring to FIGS. 3, 4, 6, 7, 9, 10, 15 and 17, in one or more examples, the fitting connector 104 includes a fitting gasket 182. The fitting gasket 182 is located on the fitting-first-end outer surface 192 of the fitting first end 146. In one or more examples, with the fitting first end 146 received by the socket first end 118, the fitting gasket 182 is located at the socket first opening 122. The fitting gasket 182 is configured to contact and form an air-tight seal with the socket-first-end inner surface 140 when the fitting first end 146 is inserted within the socket first opening 122 of the socket first end 118.

Referring to FIGS. 3, 4, 6, 7, 9, 10 and 17, in one or more examples, the socket connector 102 includes the socket gasket 180 that is located along the socket-first-end inner surface 140 of the socket first end 118. The fitting connector 104 includes the fitting gasket 182 that is located around the fitting-first end outer surface of the fitting first end 146. In one or more examples, with the fitting first end 146 received by the socket first end 118, the socket gasket 180 is located at the fitting first opening 150 and the fitting gasket 182 is located at the socket first opening 122.

Figure 16:
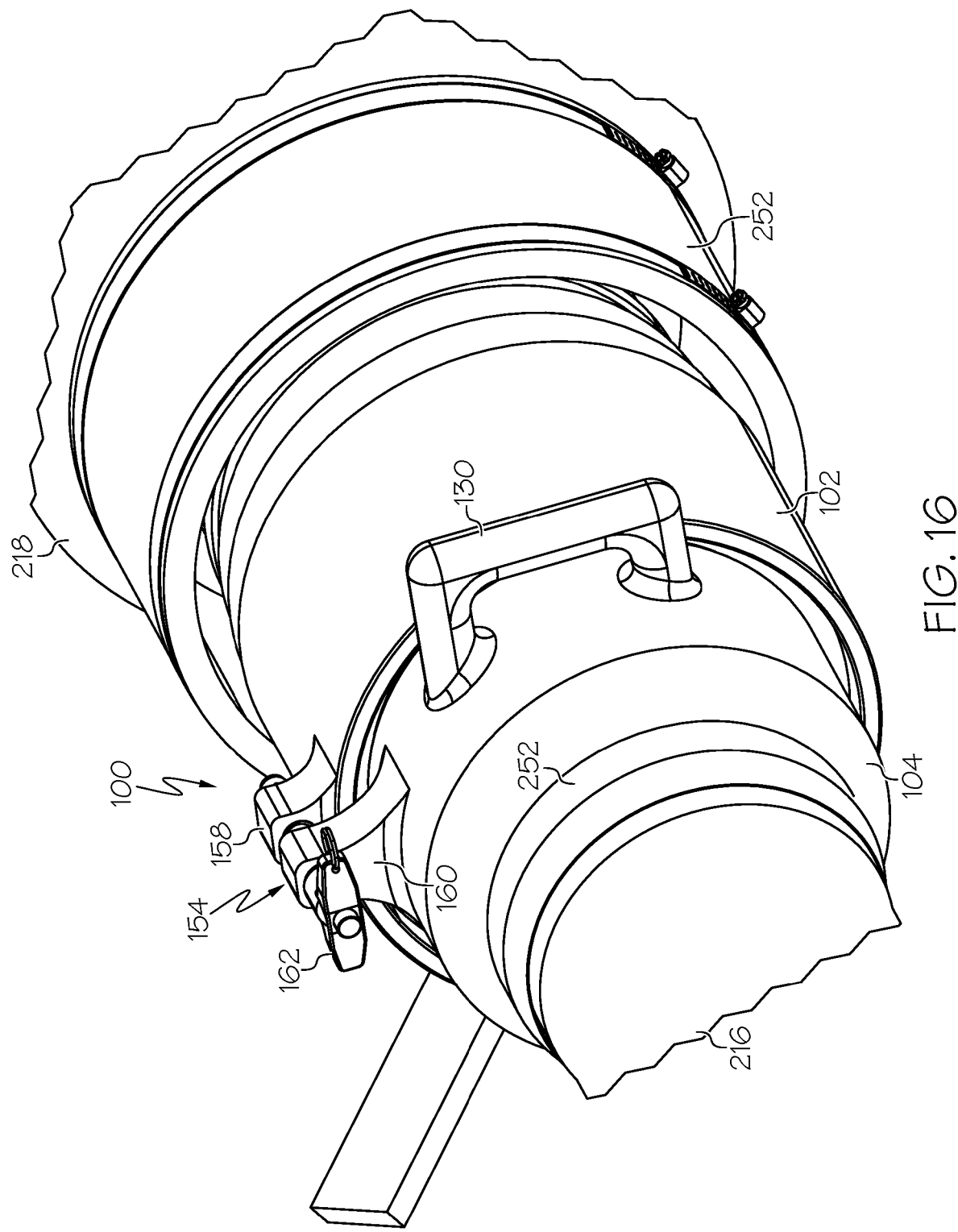
FIG. 16 is a schematic, perspective view of an example of the twist-lock connector joining a first section and a second section of the system.

Referring to FIGS. 7 and 16, in one or more examples, the fitting connector 104 includes a handle 130. The handle 130 enables manipulation of the fitting connector 104 during insertion of the fitting connector 104 in the socket connector 102 and rotation of the fitting connector 104 about the connector axis 110 relative to the socket connector 102 when coupling the socket connector 102 and the fitting connector 104 together. In one or more examples, the handle 130 extends from the fitting body 144.

In one or more examples, the socket connector 102 and the fitting connector 104 are connected by a transition fit.

Referring to FIGS. 1, 2, 5 and 8, in one or more examples, the socket connector 102 is configured to be coupled to the manifold 202. The fitting connector 104 is configured to be coupled to the hose 204. However, in other examples (not explicitly illustrated), the socket connector 102 is configured to be coupled to the hose 204. The fitting connector 104 is configured to be coupled to the manifold 202.

Figure 11:
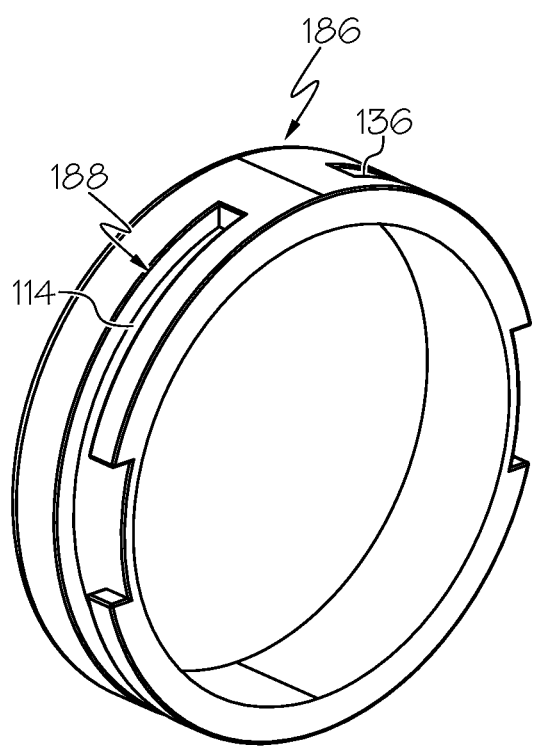
FIG. 11 is a schematic, perspective view of an example of a socket cap for the socket connector.
Figure 12:
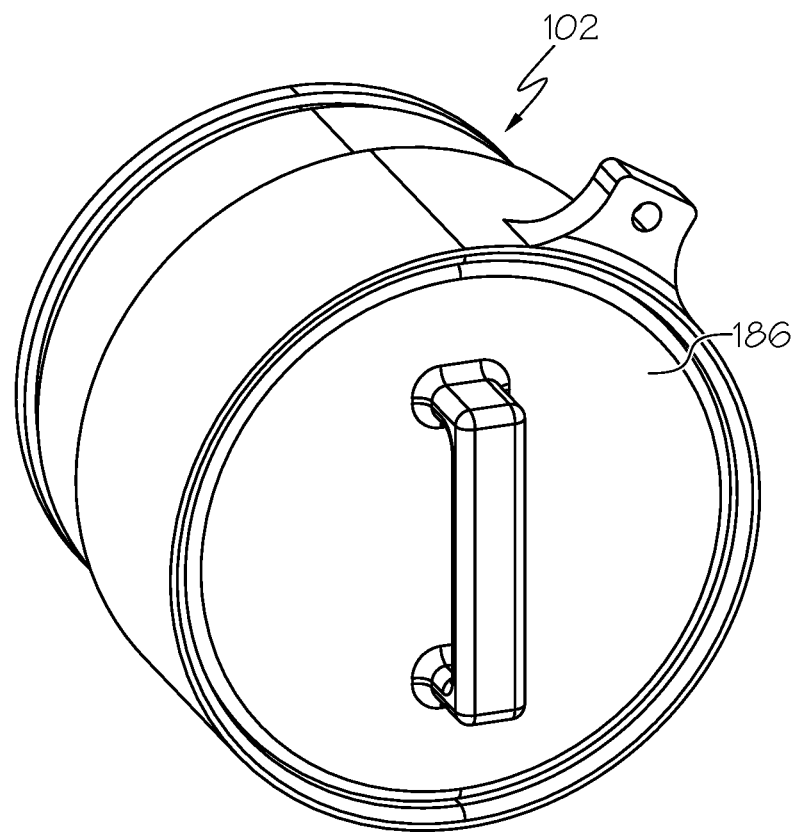
FIG. 12 is a schematic, perspective view of an example of the socket cap of FIG. 11 coupled to the socket connector.

Referring to FIGS. 11, 12 and 17, in one or more examples, the twist-lock connector 100 includes a socket cap 186. The socket cap 186 includes a cap twist-lock 188. The socket connector 102 receives the socket cap 186 to engage the cap twist-lock 188 and the socket twist-lock 106 together by rotating the socket cap 186 about the connector axis 110 relative to the socket connector 102.

Referring to FIGS. 11, 12 and 17, in one or more examples, the socket twist-lock 106 includes one of the groove 114 or the protrusion 112. The cap twist-lock 188 includes another (e.g., cooperating or complementary) one of the protrusion 112 or the groove 114. The protrusion 112 is seated in the groove 114 by inserting the socket cap 186 in the socket first end 118 of the socket connector 102. The protrusion 112 is moved to a secured position within the groove 114 rotating the socket cap 186 about the connector axis 110 relative to the socket connector 102.

Figure 13:
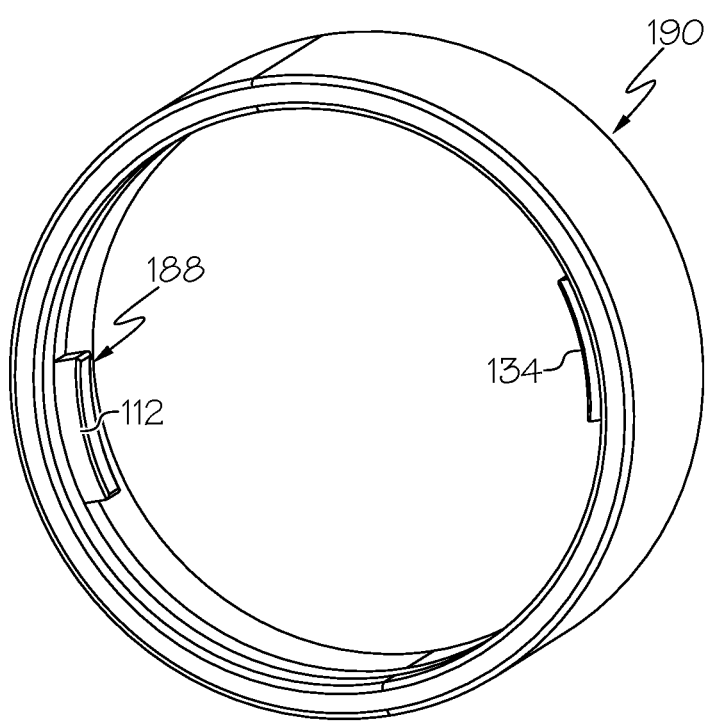
FIG. 13 is a schematic, perspective view of an example of a fitting cap for the fitting connector.
Figure 14:
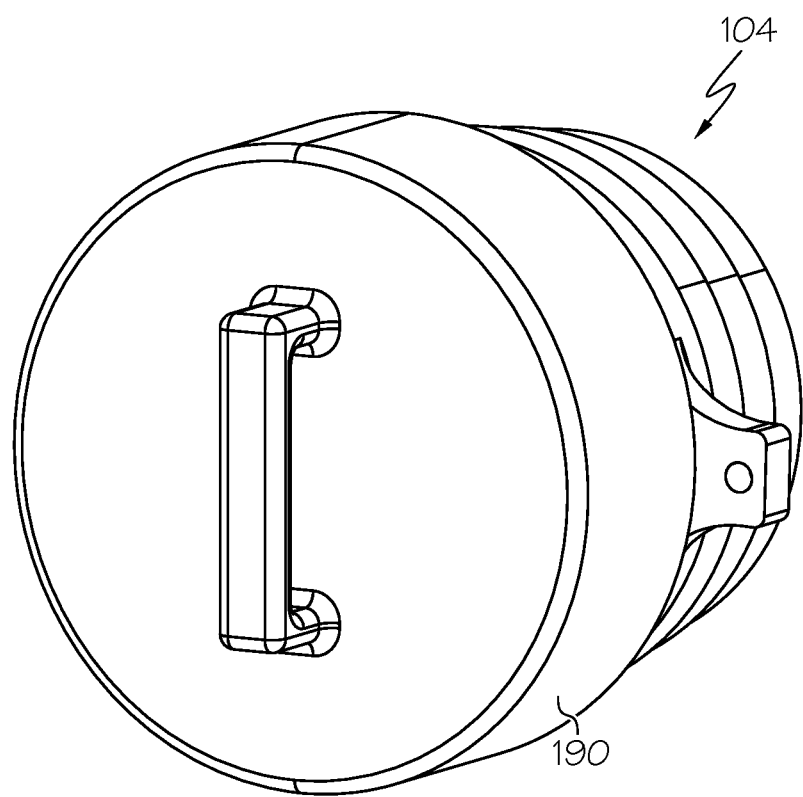
FIG. 14 is a schematic, perspective view of an example of the fitting cap of FIG. 13 coupled to the fitting connector.
Figure 15:
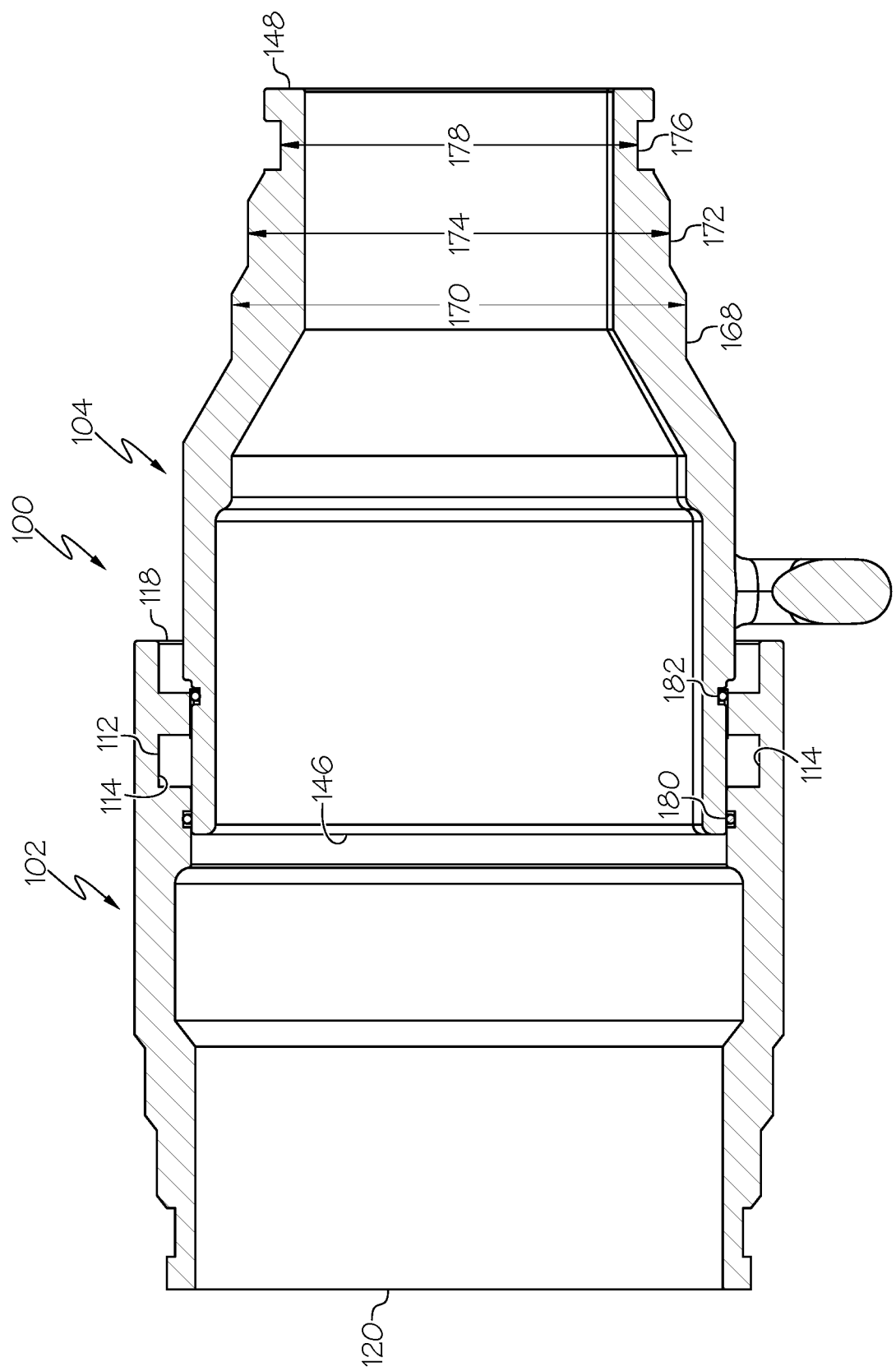
FIG. 15 is a schematic, sectional view of an example of the twist-lock connector.

Referring to FIGS. 13, 14 and 17, in one or more examples, the twist-lock connector 100 includes a fitting cap 190. The fitting cap 190 includes a cap twist-lock 188. The fitting cap 190 receives the fitting connector 104 to engage the cap twist-lock 188 and the fitting twist-lock 108 together by rotating the fitting cap 190 about the connector axis 110 relative to the fitting connector 104.

Referring to FIGS. 13, 14 and 17, in one or more examples, the fitting twist-lock 108 includes one of the groove 114 or the protrusion 112. The cap twist-lock 188 includes another (e.g., cooperating or complementary) one of the protrusion 112 or the groove 114. The protrusion 112 is seated in the groove 114 by inserting the fitting first end 146 of the fitting connector 104 in the fitting cap 190. The protrusion 112 is moved to a secured position within the groove 114 rotating the fitting cap 190 about the connector axis 110 relative to the fitting connector 104.

Referring to FIGS. 1, 2, 5, 8, 16 and 17, disclosed are examples of the system 200 for conveying gas, for example, in a manufacturing environment 250 (FIG. 17). The system 200 includes a number of elements, features, and components. In one or more examples, different sections of the system 200 are coupled together using examples of the twist-lock connector 100 (FIGS. 1-16). The following are examples of the system 200, according to the present disclosure. Not all of the elements, features, and/or components described or illustrated in one example are required in that example. Some or all of the elements, features, and/or components described or illustrated in one example can be combined with other examples in various ways without the need to include other elements, features, and/or components described in those other examples, even though such combination or combinations are not explicitly described or illustrated by example herein.

In one or more examples, the system 200 includes the first section 216, the second section 218, and the twist-lock connector 100 for connecting the first section 216 and the second section 218 together in fluid communication. The twist-lock connector 100 includes the socket connector 102 that includes the socket twist-lock 106. The twist-lock connector 100 includes the fitting connector 104 that includes the fitting twist-lock 108. The socket connector 102 receives the fitting connector 104 to engage the fitting twist-lock 108 and the socket twist-lock 106 together by rotating the fitting connector 104 about a connector axis 110 relative to the socket connector 102.

Referring to FIGS. 1 and 5, in one or more examples, the second section 218 includes the hose 204. In these examples, the hose 204 is an intake-hose 212 and the twist-lock connector 100 is an intake twist-lock connector 208.

Referring still to FIGS. 1, 2 and 8, in one or more examples, the second section 218 includes the hose 204. In these examples, the hose 204 is an output-hose 214 and the twist-lock connector 100 is an output twist-lock connector 210.

Figure 18:
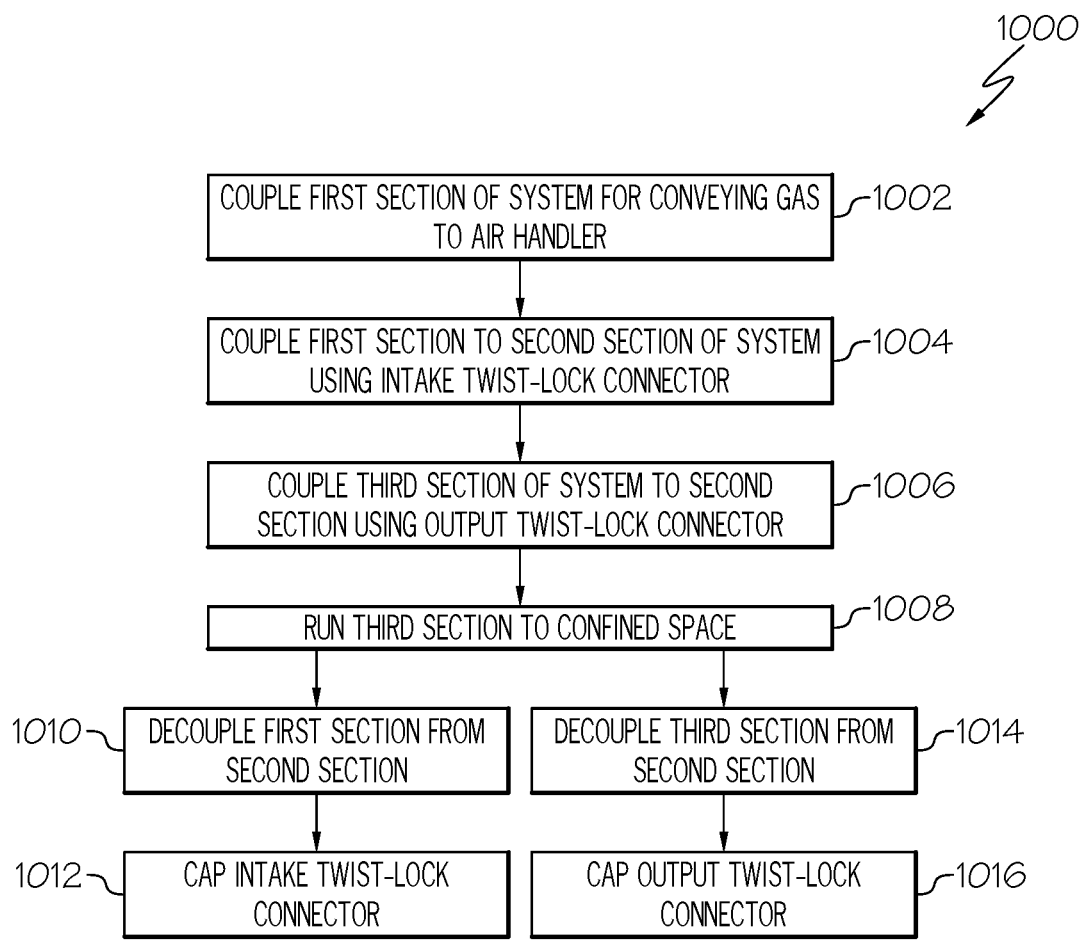
FIG. 18 is a flow diagram of an example of a method for conveying gas.

Referring generally to FIGS. 1-17 and particularly to FIG. 18, disclosed are examples of the method 1000 conveying gas. In one or more examples, the method 1000 is implemented using the system 200 (FIG. 16), which includes a number of sections 238 that are coupled together using a number of twist-lock connectors 100. The following are examples of the method 1000, according to the present disclosure. Not all of the elements, steps, and/or operations described or illustrated in one example are required in that example. Some or all of the elements, steps, and/or operations described or illustrated in one example can be combined with other examples in various ways without the need to include other elements, steps, and/or operations described in those other examples, even though such combination or combinations are not explicitly described or illustrated by example herein.

Referring to FIG. 18, in one or more examples, the method 1000 includes a step of (block 1002) coupling the first section 216 of the system 200 for conveying gas to the air handler 222. The method 1000 includes a step of (block 1004) coupling the first section 216 to the second section 218 of the system 200 using the intake twist-lock connector 208. The method 1000 includes a step of (block 1006) coupling the third section 228 of the system 200 to the second section 218 using the output twist-lock connector 210. The method 1000 includes a step of (block 1008) running the third section 228 to the space 230, such as a confined space.

Referring to FIGS. 1 and 17, in one or more examples, according to the method 1000, each one of the intake twist-lock connector 208 and the output twist-lock connector 210 includes the socket connector 102 and the fitting connector 104. The socket connector 102 includes the socket twist-lock 106. The fitting connector 104 includes the fitting twist-lock 108. The socket connector 102 receives the fitting connector 104 to engage the fitting twist-lock 108 and the socket twist-lock 106 together by rotating the fitting connector 104 about a connector axis 110 relative to the socket connector 102.

Referring again to FIG. 18, in one or more examples, the method 1000 includes a step of (block 1010) decoupling the first section 216 from the second section 218 and a step of (block 1012) capping the intake twist-lock connector 208. In one or more examples, the method 1000 includes a step of (block 1014) decoupling the third section 228 from the second section 218 and a step of (block 1016) capping the output twist-lock connector 210.

Figure 19:
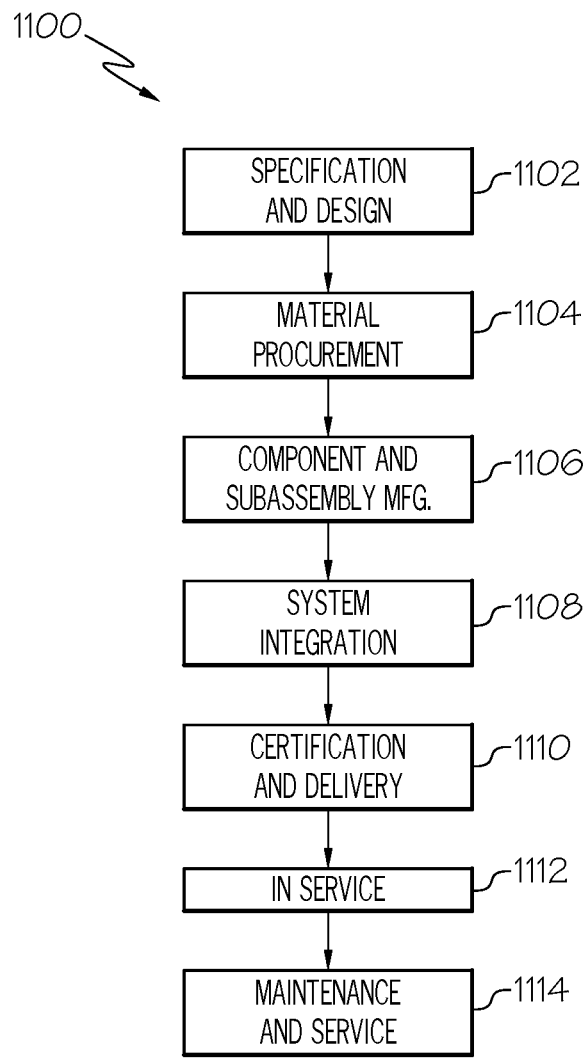
FIG. 19 is a flow diagram of an example of an aircraft manufacturing and service method.
Figure 20:
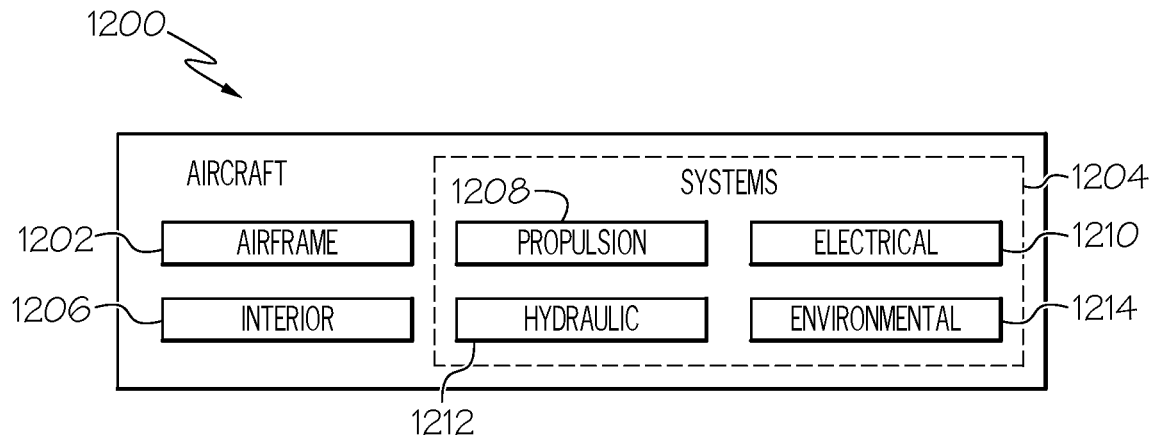
FIG. 20 is a schematic block diagram of an example of an aircraft.

Referring now to FIGS. 19 and 20, examples of the system 200, the twist-lock connector 100, and the method 1000 described herein, may be related to, or used in the context of, the aircraft manufacturing and service method 1100, as shown in the flow diagram of FIG. 19 and the aircraft 1200, as schematically illustrated in FIG. 20. As an example, the aircraft 1200 and/or the aircraft production and service method 1100 may include or utilize the system 200 and/or the method 1000 for conveying gas, such as air, to desired spaces during manufacture or during service.

Referring to FIG. 20, which illustrates an example of the aircraft 1200. In one or more examples, the aircraft 1200 includes the airframe 1202 having the interior 1206. The aircraft 1200 includes a plurality of onboard systems 1204 (e.g., high-level systems). Examples of the onboard systems 1204 of the aircraft 1200 include propulsion systems 1208, hydraulic systems 1212, electrical systems 1210, and environmental systems 1214. In other examples, the onboard systems 1204 also includes one or more control systems coupled to the airframe 1202 of the aircraft 1200. In yet other examples, the onboard systems 1204 also include one or more other systems, such as, but not limited to, communications systems, avionics systems, software distribution systems, network communications systems, passenger information/entertainment systems, guidance systems, radar systems, weapons systems, and the like.

Referring to FIG. 19, during pre-production of the aircraft 1200, the manufacturing and service method 1100 includes specification and design of the aircraft 1200 (block 1102) and material procurement (block 1104). During production of the aircraft 1200, component and subassembly manufacturing (block 1106) and system integration (block 1108) of the aircraft 1200 take place. Thereafter, the aircraft 1200 goes through certification and delivery (block 1110) to be placed in service (block 1112). Routine maintenance and service (block 1114) includes modification, reconfiguration, refurbishment, etc. of one or more systems of the aircraft 1200.

Each of the processes of the manufacturing and service method 1100 illustrated in FIG. 19 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

Examples of the system 200, the twist-lock connector 100, and the method 1000 shown and described herein, may be employed during any one or more of the stages of the manufacturing and service method 1100 shown in the flow diagram illustrated by FIG. 19. In an example, gas, such as air, may be conveyed to and/or from a desired space using the system 200, having sections 238 coupled together using the twist-lock connector 100, or according to the method 1000 during a portion of component and subassembly manufacturing (block 1106) and/or system integration (block 1108). Further, gas, such as air, may be conveyed to and/or from a desired space using the system 200, having sections 238 coupled together using the twist-lock connector 100, or according to the method 1000 while the aircraft 1200 is in service (block 1112). Also, gas, such as air, may be conveyed to and/or from a desired space using the system 200, having sections 238 coupled together using the twist-lock connector 100, or according to the method 1000 during system integration (block 1108) and certification and delivery (block 1110). Similarly, gas, such as air, may be conveyed to and/or from a desired space using the system 200, having sections 238 coupled together using the twist-lock connector 100, or according to the method 1000 while the aircraft 1200 is in service (block 1112) and during maintenance and service (block 1114).

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components, or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represents a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

FIGS. 1-17 and 20, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1-17 and 20, referred to above, need be included in every example and not all elements, features, and/or components described herein are necessarily depicted in each illustrative example. Accordingly, some of the elements, features, and/or components described and illustrated in FIGS. 1-17 and 20 may be combined in various ways without the need to include other features described and illustrated in FIGS. 1-17 and 20, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1-17 and 20, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1-17 and 20, and such elements, features, and/or components may not be discussed in detail herein with reference to each of FIGS. 1-17 and 20. Similarly, all elements, features, and/or components may not be labeled in each of FIGS. 1-17 and 20, but reference numerals associated therewith may be utilized herein for consistency.

In FIGS. 18 and 19, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 18 and 19 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the twist-lock connector 100, the system 200, and the method 1000 have been shown and described, modifications may occur to those skilled in the art upon reading the specification. The present application includes such modifications and is limited only by the scope of the claims.

What is claimed is:

1. A twist-lock connector for coupling a first section and a second section of a system for conveying gas, the twist-lock connector comprising:
   a socket connector comprising:
      a socket body comprising a socket inner surface and a socket outer surface;
      a socket first end having a socket first opening;
      a socket second end having a socket second opening;
      a socket gasket situated coupled to the socket body proximate the socket first end; and
      a socket twist-lock located between socket gasket and the socket first end; and
   a fitting connector comprising:
      a fitting body comprising a fitting inner surface and a fitting outer surface;
      a fitting first end having a fitting first opening;
      a fitting second end having a fitting second opening;
      a fitting gasket coupled to the fitting body proximate the fitting first end; and
      a fitting twist-lock located between the fitting gasket and the fitting first end,
   wherein the socket connector receives the fitting connector to engage the fitting twist-lock and the socket twist-lock together by rotating the fitting connector about a connector axis relative to the socket connector, situate the socket gasket between the socket inner surface and the fitting outer surface, and situate the fitting gasket between the fitting outer surface and the socket inner surface such that the fitting twist-lock and the socket twist-lock are positioned along the connector axis between the socket gasket and the fitting gasket.

2. The twist-lock connector of claim 1, wherein:
   the socket twist-lock comprises one of a groove or a protrusion;
   the fitting twist-lock comprises another one of the protrusion or the groove;
   the protrusion is seated in the groove by inserting the fitting connector in the socket connector; and
   the protrusion is moved to a secured position within the groove rotating the fitting connector about the connector axis relative to the socket connector.

3. The twist-lock connector of claim 2, wherein the socket twist-lock further comprises a stop that limits rotation of the fitting connector about the connector axis relative to the socket connector.

4. The twist-lock connector of claim 2, further comprising a connector lock that selectively enables rotation of the fitting connector about the connector axis relative to the socket connector or restricts rotation of the fitting connector about the connector axis relative to the socket connector.

5. The twist-lock connector of claim 2, wherein:
the socket twist-lock further comprises one of a second groove or a second protrusion;
the fitting twist-lock further comprises another one of the second protrusion or the second groove;
the second protrusion is seated in the second groove by inserting the fitting connector in the socket connector; and
the second protrusion is moved to a secured position within the second groove by rotating the fitting connector about the connector axis relative to the socket connector.

6. The twist-lock connector of claim 5, wherein the protrusion and the second protrusion are diametrically opposite to each other.

7. The twist-lock connector of claim 1, wherein:
the socket first end comprises a socket-first-end inner surface and a socket-first-end outer surface;
the socket twist-lock comprises one of a groove that is formed in the socket-first-end inner surface or a protrusion that projects radially inward from the socket-first-end inner surface;
the fitting first end comprises a fitting-first-end inner surface and a fitting-first-end outer surface;
the fitting twist-lock comprises another one of the protrusion that projects radially outward from the fitting-first-end outer surface or the groove that is formed in the fitting-first-end outer surface;
the protrusion is seated in the groove by inserting the fitting first end in the socket first end; and
the protrusion is moved to a secured position within the groove by rotating the fitting connector about the connector axis relative to the socket connector.

8. The twist-lock connector of claim 7, wherein:
the socket twist-lock further comprises one of a second groove that is formed in the socket-first-end inner surface or a second protrusion that projects radially inward from the socket-first-end inner surface;
the fitting twist-lock further comprises another one of the second protrusion that projects radially outward from the fitting-first-end outer surface or the second groove that is formed in the fitting-first-end outer surface;
the second protrusion is seated in the second groove by inserting the fitting first end in the socket first end; and
the second protrusion is moved to a secured position within the second groove by rotating the fitting connector about the connector axis relative to the socket connector.

9. The twist-lock connector of claim 8, wherein the protrusion and the second protrusion are diametrically opposite to each other.

10. The twist-lock connector of claim 8, wherein:
the socket twist-lock further comprises a stop located on the socket-first-end inner surface between the groove and the second groove; and
the stop limits rotation of the fitting connector about the connector axis relative to the socket connector.

11. The twist-lock connector of claim 10, wherein:
the socket twist-lock further comprises a second stop located on the socket-first-end inner surface between the groove and the second groove;
the stop limits rotation of the fitting connector about the connector axis relative to the socket connector in a first rotational direction relative; and
the second stop limits rotation of the fitting connector about the connector axis relative to the socket connector in a second rotational direction that is opposite the first rotational direction.

12. The twist-lock connector of claim 11, wherein:
the groove and the second groove are semi-annular; and
the stop and the second stop are diametrically opposite to each other.

13. The twist-lock connector of claim 1, further comprising a connector lock that selectively enables rotation of the fitting connector about the connector axis relative to the socket connector or restricts rotation of the fitting connector about the connector axis relative to the socket connector.

14. The twist-lock connector of claim 13, wherein the connector lock comprises:
a socket flange that projects outwardly from the socket body;
a fitting flange that projects outwardly from the fitting body; and
a fastener that connects the socket flange and the fitting flange.

15. The twist-lock connector of claim 1, wherein:
the second section of the system comprises a hose; and
the fitting second end is configured to be inserted within a hose opening of the hose.

16. The twist-lock connector of claim 15, wherein:
the fitting second end comprises:
a first portion that extends from the fitting body along the connector axis and has a first outer dimension;
a second portion that extends from the first portion along the connector axis and has a second outer dimension; and
the second outer dimension is less than the first outer dimension.

17. The twist-lock connector of claim 16, wherein:
the fitting second end further comprises a third portion that extends from the second portion along the connector axis and has a third outer dimension; and
the third outer dimension is less than the second outer dimension.

18. The twist-lock connector of claim 1, wherein the socket gasket and the fitting gasket contact and form an air-tight seal with the socket body and the fitting body when the fitting connector is inserted within the socket connector.

19. A system for conveying gas, the system comprising:
a first section;
a second section; and
a twist-lock connector for connecting the first section and the second section together in fluid communication, wherein:
the twist-lock connector comprises:
a socket connector comprising:
a socket body comprising a socket inner surface and a socket outer surface;
a socket first end having a socket first opening;
a socket second end having a socket second opening;
a socket gasket coupled to the socket body proximate the socket first end; and
a socket twist-lock located between socket gasket and the socket first end; and
a fitting connector comprising:
a fitting body comprising a fitting inner surface and a fitting outer surface;
a fitting first end having a fitting first opening;
a fitting second end having a fitting second opening;

a fitting gasket coupled to the fitting body proximate the fitting first end; and
a fitting twist-lock located between the fitting gasket and the fitting first end; and
the socket connector receives the fitting connector to engage the fitting twist-lock and the socket twist-lock together by rotating the fitting connector about a connector axis relative to the socket connector, to situate the socket gasket between the socket inner surface and the fitting outer surface, and to situate the fitting gasket between the fitting outer surface and the socket inner surface such that the fitting twist-lock and the socket twist-lock are positioned along the connector axis between the socket gasket and the fitting gasket.

20. A method for conveying gas, the method comprising:
coupling a first section of a system for conveying gas to an air handler;
coupling the first section to a second section of the system using an intake twist-lock connector;
coupling a third section of the system to the second section using an output twist-lock connector;
running the third section to a confined space,
wherein:
each one of the intake twist-lock connector and the output twist-lock connector comprises:
a socket connector comprising:
a socket body comprising a socket inner surface and a socket outer surface;
a socket first end having a socket first opening;
a socket second end having a socket second opening;
a socket gasket coupled to the socket body proximate the socket first end; and
a socket twist-lock located between socket gasket and the socket first end; and
a fitting connector comprising:
a fitting body comprising a fitting inner surface and a fitting outer surface;
a fitting first end having a fitting first opening;
a fitting second end having a fitting second opening;
a fitting gasket coupled to the fitting body proximate the fitting first end; and
a fitting twist-lock located between the fitting gasket and the fitting first end;
the socket connector receives the fitting connector to engage the fitting twist-lock and the socket twist-lock together by rotating the fitting connector about a connector axis relative to the socket connector, to situate the socket gasket between the socket inner surface and the fitting outer surface, and to situate the fitting gasket between the fitting outer surface and the socket inner surface such that the fitting twist-lock and the socket twist-lock are positioned along the connector axis between the socket gasket and the fitting gasket; and
forming an air-tight seal between the socket body and the fitting body at each end of the fitting twist-lock and the socket twist-lock with the socket gasket and the fitting gasket when the fitting connector is inserted within the socket connector.

\* \* \* \* \*